(12) United States Patent
Mizushima et al.

(10) Patent No.: US 11,254,157 B2
(45) Date of Patent: Feb. 22, 2022

(54) INKJET RECORDING METHOD

(71) Applicant: KAO CORPORATION, Tokyo (JP)

(72) Inventors: Ryuma Mizushima, Wakayama (JP); Yasufumi Ueda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 116 days.

(21) Appl. No.: 16/305,020

(22) PCT Filed: Jun. 1, 2017

(86) PCT No.: PCT/JP2017/020448
§ 371 (c)(1),
(2) Date: Nov. 27, 2018

(87) PCT Pub. No.: WO2017/209249
PCT Pub. Date: Dec. 7, 2017

(65) Prior Publication Data
US 2020/0230988 A1      Jul. 23, 2020

(30) Foreign Application Priority Data
Jun. 1, 2016  (JP) .............................. JP2016-110334

(51) Int. Cl.
*B41M 5/00* (2006.01)
*C09D 11/322* (2014.01)
*C08F 20/06* (2006.01)

(52) U.S. Cl.
CPC ............ *B41M 5/0047* (2013.01); *B41M 5/00* (2013.01); *C09D 11/322* (2013.01); *C08F 20/06* (2013.01)

(58) Field of Classification Search
CPC ..... B41M 5/0047; B41M 5/00; C09D 11/322; C08F 20/06
See application file for complete search history.

(56) References Cited

U.S. PATENT DOCUMENTS

| | | | |
|---|---|---|---|
| 10,266,712 B2* | 4/2019 | Wakabayashi | ....... C09D 11/322 |
| 2007/0040882 A1 | 2/2007 | Kanaya et al. | |
| 2009/0295847 A1 | 12/2009 | Mukai et al. | |
| 2011/0124801 A1 | 5/2011 | Mitta et al. | |
| 2015/0005466 A1* | 1/2015 | Roberts | ................. C08F 220/34 526/279 |
| 2015/0344713 A1 | 12/2015 | Mizushima et al. | |
| 2016/0130453 A1 | 5/2016 | Eguchi | |
| 2017/0267885 A1 | 9/2017 | Wakabayashi et al. | |

FOREIGN PATENT DOCUMENTS

| | | | |
|---|---|---|---|
| CN | 1730575 A | | 2/2006 |
| CN | 105246989 A | | 1/2016 |
| JP | 2007-50652 A | | 3/2007 |
| JP | 2007-119708 A | | 5/2007 |
| JP | 2009-114280 A | | 5/2009 |
| JP | 2012-172070 A | | 9/2012 |
| JP | 2013-230638 A | | 11/2013 |
| JP | 2014-43585 A | | 3/2014 |
| JP | 2014-139298 A | | 7/2014 |
| JP | 2015-6795 A | | 1/2015 |
| JP | 2015-013990 | * | 1/2015 |
| JP | 2016-43695 A | | 4/2016 |
| WO | WO 2016/027801 | * | 2/2016 |

OTHER PUBLICATIONS

International Search Report for PCT/JP2017/020448 (PCT/ISA/210) dated Aug. 29, 2017.
Extended European Search Report for European Application No. 17806799.7, dated Mar. 11, 2020.

* cited by examiner

*Primary Examiner* — Patrick D Niland
(74) *Attorney, Agent, or Firm* — Birch, Stewart, Kolasch & Birch, LLP

(57) ABSTRACT

The present invention relates to an ink-jet printing method including the step of ejecting a water-based ink containing pigment-containing water-insoluble polymer particles and water onto a printing medium to print characters or images on the printing medium, in which the pigment is at least one pigment selected from the group consisting of C.I. Pigment Red 177, C.I. Pigment Red 254, C.I. Pigment Green 7, C.I. Pigment Green 36 and C.I. Pigment Blue 15:6; the water-insoluble polymer constituting the particles contains a constitutional unit derived from an ionic monomer, a constitutional unit derived from a hydrophobic monomer and a constitutional unit derived from a monomer capable of forming a graft chain; and the printing medium is a low-water absorbing printing medium.

17 Claims, No Drawings

INKJET RECORDING METHOD

FIELD OF THE INVENTION

The present invention relates to an ink-jet printing method.

BACKGROUND OF THE INVENTION

In ink-jet printing methods, droplets of ink are directly projected onto a printing medium from very fine nozzles and allowed to adhere to the printing medium to obtain printed materials on which characters or images are printed. The ink-jet printing methods have now been extensively employed not only in printing applications for ordinary consumers but also recently in commercial and industrial printing applications because of various advantages such as easiness of full coloration, low cost, capability of using a plain paper as the printing medium, non-contact with printed characters or images, etc.

On the other hand, it has been required to print characters or images on a printing medium for commercial printing purposes using a low-water absorbing printing medium, e.g., a low-water absorbing coated paper such as an offset coated paper or a non-water absorbing resin film such as a polyvinyl chloride resin film, a polypropylene resin film and a polyester resin film.

For example, JP 2014-139298A (Patent Literature 1) discloses an ink-jet printing method for printing characters or images on a a low-water absorbing printing medium using an ink containing pigment-containing water-insoluble polymer particles which is excellent in spreading of dot sizes, gloss and rub fastness when printed on the low-water absorbing printing medium, in which the water-insoluble polymer contains a constitutional unit derived from an ionic monomer, a constitutional unit derived from an aromatic ring-containing hydrophobic monomer and a constitutional unit derived from an ethyleneoxy chain-containing hydrophilic monomer.

On the other hand, in ordinary ink-jet printing methods, there have been employed inks using yellow, magenta and cyan colorants, i.e., colorants having three primary colors, and a black colorant, in which the three primary color inks are subjected to subtractive color mixing on a printing medium to reproduce various colors on the printing medium. In addition, there has also been proposed the method of using inks containing colorants having hues other than the three primary colors, such as red, green, blue, orange and violet colors (hereinafter also referred to as "spot color inks") in addition to the aforementioned three primary color inks and black ink to expand a color reproducible range.

For example, JP 2012-172070A (Patent Literature 2) discloses an aqueous orange ink for ink-jet printing which can be suitably used for full color printing and has excellent storage stability, and contains a (meth)acrylic acid ester resin and a polyurethane resin as well as a specific organic pigment, an organic pigment derivative and water.

SUMMARY OF THE INVENTION

The present invention relates to an ink-jet printing method including the step of ejecting a water-based ink containing pigment-containing water-insoluble polymer particles and water onto a printing medium to print characters or images on the printing medium, in which the pigment is at least one pigment selected from the group consisting of C.I. Pigment Red 177, C.I. Pigment Red 254, C.I. Pigment Green 7, C.I. Pigment Green 36 and C.I. Pigment Blue 15:6;

the water-insoluble polymer constituting the particles contains a constitutional unit derived from (b-1) an ionic monomer, a constitutional unit derived from (b-2) a hydrophobic monomer and a constitutional unit derived from (b-3) a monomer capable of forming a graft chain; and the printing medium has a water absorption of not less than 0 g/m$^2$ and not more than 10 g/m$^2$ as measured in a pure water contact time of 100 milliseconds.

DETAILED DESCRIPTION OF THE INVENTION

In the case of reproducing colors other than three primary colors including yellow, magenta and cyan colors by ink-jet printing methods, it has been found that when using spot color inks to print characters or images on a low-water absorbing printing medium, the resulting printed materials tend to suffer from deterioration in gloss or fail to stably exhibit good water resistance.

In addition, in the other methods for reproducing the colors other than the three primary colors in which the two or more color inks among the three primary color inks are used in combination with each other, for example, in the case of conducting such printing on a low-water absorbing printing medium using the colorants as described in Patent Literature 1, it has also been found that when the yellow ink containing C.I. Pigment Yellow 74 and the magenta ink containing C.I. Pigment Red 122 are used in combination with each other to reproduce a red color on the low-water absorbing printing medium, the resulting printed materials are deteriorated in water resistance. For this reason, when reproducing the colors other than the three primary colors under severe environmental conditions such as outdoor conditions, the resulting printed materials tend to be insufficient in gloss and water resistance. Therefore, it has been demanded to improve gloss and water resistance of the printed materials even under these conditions.

Thus, the present invention relates to an ink-jet printing method that is capable of obtaining printed materials having excellent gloss and water resistance when reproducing colors other than three primary colors on a low-water absorbing printing medium.

The present inventors have found that in the case of reproducing colors other than three primary colors on a low-water absorbing printing medium, by using a water-based ink that contains specific pigment-containing water-insoluble polymer particles in which the water-insoluble polymer constituting the particles contains a constitutional unit derived from a specific monomer as well as a graft chain, it is possible to obtain printed materials that are excellent in gloss and water resistance.

That is, the present invention relates to an ink-jet printing method including the step of ejecting a water-based ink containing pigment-containing water-insoluble polymer particles and water onto a printing medium to print characters or images on the printing medium, in which the pigment is at least one pigment selected from the group consisting of C.I. Pigment Red 177, C.I. Pigment Red 254, C.I. Pigment Green 7, C.I. Pigment Green 36 and C.I. Pigment Blue 15:6;

the water-insoluble polymer constituting the particles contains a constitutional unit derived from (b-1) an ionic monomer, a constitutional unit derived from (b-2) a hydrophobic monomer and a constitutional unit derived from (b-3) a monomer capable of forming a graft chain; and the printing medium has a water absorption of not less than 0 g/m$^2$ and not more than 10 g/m$^2$ as measured in a pure water contact time of 100 milliseconds.

In accordance with the present invention, there is provided an ink-jet printing method that is capable of obtaining printed materials having excellent gloss and water resistance even when reproducing colors other than three primary colors on a low-water absorbing printing medium. Therefore, the ink-jet printing method of the present invention can be suitably used as a printing method of obtaining printed materials used under severe environmental conditions such as outdoor conditions.

[Ink-Jet Printing Method]

The ink-jet printing method of the present invention is an ink-jet printing method including the step of ejecting a water-based ink that contains pigment-containing water-insoluble polymer particles (hereinafter also referred to as "pigment-containing polymer particles") and water onto a printing medium to print characters or images on the printing medium, in which the pigment is at least one pigment selected from the group consisting of C.I. Pigment Red (hereinafter also referred to merely as "PR") 177, PR 254, C.I. Pigment Green (hereinafter also referred to merely as "PG") 7, PG 36 and C.I. Pigment Blue (hereinafter also referred to merely as "PB") 15:6; the water-insoluble polymer constituting the particles (hereinafter also referred to merely as a "water-insoluble polymer") contains a constitutional unit derived from (b-1) an ionic monomer, a constitutional unit derived from (b-2) a hydrophobic monomer and a constitutional unit derived from (b-3) a monomer capable of forming a graft chain; and the printing medium has a water absorption of not less than 0 g/m$^2$ and not more than 10 g/m$^2$ as measured in a pure water contact time of 100 milliseconds.

Meanwhile, the term "printing" as used in the present specification means a concept that includes printing or typing operation for printing characters or images, and the term "printed material" as used in the present specification means a concept that includes printed matters or typed materials on which characters or images are printed. In addition, the term "aqueous or water-based" as used in the present specification means such a condition that water has a largest content among components of a medium contained in the ink. Furthermore, the term "low-water absorbing" as used in the present specification is intended to mean both concepts of low-liquid absorbing and non-liquid absorbing, and the low-water absorbing printing medium means a printing medium having a water absorption of not less than 0 g/m$^2$ and not more than 10 g/m$^2$ as measured under the condition that a contact time between the printing medium and pure water is 100 milliseconds.

According to the present invention, there can be attained such a special effect that in the case of reproducing colors other than three primary colors on a low-water absorbing printing medium, it is possible to obtain printed materials that are excellent in gloss and water resistance. The reason why such an effect can be attained by the present invention is considered as follows though it is not clearly determined.

That is, since the pigment is coated with the graft chain-containing water-insoluble polymer that contains the constitutional unit derived from the ionic monomer, the constitutional unit derived from the hydrophobic monomer and the constitutional unit derived from the monomer capable of forming the graft chain, it is possible to suppress flocculation of the pigment-containing polymer particles by the action of an electrostatic repulsion force owing to the constitutional unit derived from the ionic monomer and a steric repulsion force of the graft chain, and therefore improve dispersion stability of the particles in the water-based ink. On the other hand, the water-based ink containing the particles which is ejected on the low-water absorbing printing medium remains on the printing medium without being absorbed into the printing medium, so that the solvent including water is dried and removed from the water-based ink while suppressing flocculation of the pigment-containing polymer particles owing to the electrostatic repulsion force and the steric repulsion force.

When reproducing colors other than three primary colors, e.g., such as red, green and blue colors, using three primary color pigments, it is necessary to use the two or more kinds of pigments among the three primary color pigments in combination with each other. In this case, the plural kinds of pigment particles respectively having an electrostatic repulsion force and a steric repulsion force are successively ejected onto a printing medium, deposited on the printing medium in an overlapped relation to each other and then dried thereon. The solvent contained in the pigment particles that are ejected onto the printing medium earlier among the plural kinds of pigment particles is being dried out on the printing medium, whereas the solvent contained in the pigment particles that are newly ejected later is still kept in a non-dried state. Thus, respective coating films constituted of the plural kinds of pigment particles which are different in degree of drying of the solvent from each other are overlapped on the printing medium. As a result, it is considered that since the electrostatic repulsion force and the steric repulsion force are unable to act sufficiently between the particles during drying of the solvent, flocculation of a part of the pigment particles tends to proceed, so that the obtained ink film tends to be deteriorated in uniformity and smoothness on a surface thereof.

In the present invention, at least one pigment selected from the group consisting of PR177, PR254, PG7, PG36 and PB15:6 is used as the pigment. Therefore, even when reproducing colors other than three primary colors, the frequency of occurrence of such a condition that the plural kinds of pigment particles are overlapped with each other is reduced, so that the electrostatic repulsion force and the steric repulsion force can act sufficiently. For this reason, in the present invention, it is possible to form a rigid smooth coating film of the pigment particles even on a low-water absorbing printing medium, and suppress irregular reflection owing to the pigment particles on the surface of the resulting printed material. As a result, it is considered that the resulting printed material is improved in gloss and water resistance.

On the other hand, in the case where the pigment is dispersed with a polymer that does not contain any one or more of the constitutional unit derived from the ionic monomer, the constitutional unit derived from the hydrophobic monomer and the constitutional unit derived from the monomer capable of forming a graft chain or in the case where the pigment is dispersed with a polymer that is not in the form of a water-insoluble polymer even though the polymer contains all of the constitutional unit derived from the ionic monomer, the constitutional unit derived from the hydrophobic monomer and the constitutional unit derived from the monomer capable of forming a graft chain, the pigment particles tend to exhibit poor dispersion stability in the ink when the ink is ejected onto a low-water absorbing printing medium, and therefore tend to partially suffer from flocculation therebetween. As a result, it is considered that since the pigment particles fail to form a rigid smooth coating film on the low-water absorbing printing medium, the resulting printed material tends to be deteriorated in gloss and water resistance.

<Water-Based Ink>

[Pigment-Containing Water-Insoluble Polymer Particles (Pigment-Containing Polymer Particles)]

(Pigment)

The pigment to be contained in the water-based ink (hereinafter also referred to merely as an "ink") is present in the form of pigment-containing water-insoluble polymer particles from the viewpoint of improving gloss and water resistance of the resulting printed material.

The pigment used in the present invention is in the form of an organic pigment. The organic pigment is at least one pigment selected from the group consisting of PR177, PR254, PG7, PG36 and PB15:6 from the viewpoint of improving gloss and water resistance of the resulting printed material.

By using the aforementioned pigments, it is possible to obtain spot color inks that are capable of reproducing colors other than three primary colors such as red, green and blue colors.

The pigment for the red ink is preferably at least one pigment selected from the group consisting of PR177 as an anthraquinone pigment and PR254 as a diketopyrrolopyrrole pigment.

The pigment for the green ink is preferably at least one pigment selected from the group consisting of PG7 as a chlorinated copper phthalocyanine pigment and PG36 as a brominated copper phthalocyanine pigment.

The pigment for the blue ink is preferably PB15:6 as an ε-type copper phthalocyanine pigment.

(Water-Insoluble Polymer)

The water-insoluble polymer constituting the pigment-containing polymer particles contains the constitutional units derived from the below-mentioned specific monomers and is in the form of a graft chain-containing water-insoluble polymer, and further has not only a function as a pigment dispersant capable of exhibiting the effect of dispersing the pigment in the ink, but also a function as a fixing agent for fixing the pigment on a low-water absorbing printing medium.

The term "water-insoluble" as used herein means that the polymer has a solubility in water of not more than 10 g when the polymer is dried to constant weight at 105° C. for 2 hours and then dissolved in 100 g of water at 25° C. The solubility in water of the water-insoluble polymer is preferably not more than 5 g and more preferably not more than 1 g. In the case where the water-insoluble polymer is in the form of an anionic polymer, the solubility thereof means a solubility of the polymer whose anionic groups are neutralized completely (i.e., 100%) with sodium hydroxide. Also, in the case where the water-insoluble polymer is in the form of a cationic polymer, the solubility thereof means a solubility of the polymer whose cationic groups are neutralized completely (i.e., 100%) with hydrochloric acid.

The water-insoluble polymer contains a constitutional unit derived from (b-1) an ionic monomer (hereinafter also referred to merely as a "component (b-1)"), a constitutional unit derived from (b-2) a hydrophobic monomer (hereinafter also referred to merely as a "component (b-2)") and a constitutional unit derived from (b-3) a monomer capable of forming a graft chain (hereinafter also referred to merely as a "component (b-3)"). By incorporating the aforementioned water-insoluble polymer into the water-based ink, it is possible to suppress flocculation of the pigment-containing polymer particles by the action of an electrostatic repulsion force owing to the constitutional unit derived from the ionic monomer and a steric repulsion force of the graft chain, and therefore improve dispersion stability of the particles in the water-based ink. The graft chain is preferably at least one chain selected from the group consisting of a polyalkylene glycol chain and a polystyrene chain from the viewpoint of improving gloss and water resistance of the resulting printed material.

Examples of the water-insoluble polymer used in the present invention include polyesters, polyurethanes and vinyl-based polymers. Among these polymers, preferred are vinyl-based polymers obtained by addition-polymerizing vinyl monomers (such as vinyl compounds, vinylidene compounds and vinylene compounds) from the viewpoint of improving gloss and water resistance of the resulting printed material. The vinyl-based polymer used in the present invention may be produced by copolymerizing a monomer mixture containing the ionic monomer (b-1), the hydrophobic monomer (b-2) and the monomer (b-3) capable of forming a graft chain (such a mixture is hereinafter also referred to merely as a "monomer mixture").

[(b-1) Ionic Monomer]

The component (b-1) is used as a monomer component of the water-insoluble polymer from the viewpoint of improving dispersion stability of the pigment-containing polymer particles in the ink.

Examples of the component (b-1) include an anionic monomer and a cationic monomer. Among these ionic monomers, from the viewpoint of improving dispersion stability of the pigment-containing polymer particles in the ink, preferred is the anionic monomer. The anionic monomer is preferably at least one monomer selected from the group consisting of a carboxylic acid monomer, a sulfonic acid monomer and a phosphoric acid monomer.

Specific examples of the carboxylic acid monomer include acrylic acid, methacrylic acid, crotonic acid, itaconic acid, maleic acid, fumaric acid, citraconic acid and 2-methacryloyloxymethylsuccinic acid.

Specific examples of the sulfonic acid monomer include styrenesulfonic acid, 2-acrylamido-2-methylpropanesulfonic acid and 3-sulfopropyl (meth)acrylate.

Specific examples of the phosphoric acid monomer include vinylphosphonic acid, vinyl phosphate, bis(methacryloxyethyl) phosphate, diphenyl-2-acryloyloxyethyl phosphate and diphenyl-2-methacryloyloxyethyl phosphate.

Among the aforementioned anionic monomers, from the viewpoint of improving dispersion stability of the pigment-containing polymer particles in the ink, preferred is the carboxylic acid monomer, more preferred is (meth)acrylic acid, and even more preferred is methacrylic acid.

Meanwhile, the "(meth)acrylic acid" as used herein means at least one acid selected from the group consisting of acrylic acid and methacrylic acid, and is also hereinlater defined in the same way.

[(b-2) Hydrophobic Monomer]

The component (b-2) is used as a monomer component of the water-insoluble polymer from the viewpoint of improving adsorptivity of the water-insoluble polymer to the pigment as well as from the viewpoint of improving dispersion stability of the pigment-containing polymer particles in the ink. The component (b-2) is preferably at least one monomer selected from the group consisting of a (meth)acrylic acid ester containing a hydrocarbon group derived from an aliphatic alcohol, and an aromatic group-containing monomer.

As the (meth)acrylic acid ester containing a hydrocarbon group derived from an aliphatic alcohol, preferred are those (meth) acrylic acid esters containing a hydrocarbon group derived from an aliphatic alcohol having not less than 1 and not more than 22 carbon atoms, more preferred are those (meth)acrylic acid esters containing an alkyl group having not less than 1 and not more than 22 carbon atoms, and even more preferred are those (meth)acrylic acid esters containing an alkyl group having not less than 6 and not more than 18 carbon atoms.

Examples of the (meth)acrylic acid ester containing a hydrocarbon group derived from an aliphatic alcohol include (meth)acrylates containing a linear alkyl group, such as methyl (meth)acrylate, ethyl (meth)acrylate, propyl (meth)acrylate, butyl (meth)acrylate, pentyl (meth) acrylate, octyl (meth)acrylate, decyl (meth)acrylate, dodecyl (meth)acrylate and stearyl (meth)acrylate; (meth)acrylates containing a branched alkyl group, such as isopropyl (meth) acrylate, isobutyl (meth) acrylate, tert-butyl (meth) acrylate, isopentyl (meth)acrylate, isooctyl (meth)acrylate, isodecyl (meth) acrylate, isododecyl (meth)acrylate, isostearyl (meth)acrylate and 2-ethylhexyl (meth)acrylate; and (meth)acrylates containing an alicyclic alkyl group, such as cyclohexyl (meth)acrylate.

Meanwhile, the term "(meth)acrylic acid ester" as used herein means at least one compound selected from the group consisting of an acrylic acid ester and a methacrylic acid ester. Therefore, the term "(meth)acrylate" as used herein means at least one compound selected from the group consisting of an acrylate and a methacrylate. The terms "(meth)acrylic acid ester" and "(meth)acrylate" are hereinafter defined in the same way.

The aromatic group-containing monomer is preferably a vinyl monomer containing an aromatic group having not less than 6 and not more than 22 carbon atoms which may contain a substituent group having a hetero atom, and more preferably at least one monomer selected from the group consisting of a styrene-based monomer and an aromatic group-containing (meth)acrylic acid ester. The molecular weight of the aromatic group-containing monomer is preferably less than 500.

The styrene-based monomer is preferably at least one monomer selected from the group consisting of styrene and 2-methyl styrene, and more preferably styrene.

The aromatic group-containing (meth)acrylic acid ester is preferably at least one monomer selected from the group consisting of benzyl (meth)acrylate and phenoxyethyl (meth)acrylate, and more preferably benzyl (meth)acrylate.

From the viewpoint of improving adsorptivity of the water-insoluble polymer to the pigment as well as from the viewpoint of improving dispersion stability of the pigment-containing polymer particles in the ink, the component (b-2) is preferably at least one monomer selected from the group consisting of the (meth)acrylic acid ester containing a hydrocarbon group derived from an aliphatic alcohol and the aromatic group-containing monomer, more preferably the aromatic group-containing monomer, even more preferably the vinyl monomer containing an aromatic group having not less than 6 and not more than 22 carbon atoms which may contain a substituent group having a hetero atom, further even more preferably at least one monomer selected from the group consisting of the styrene-based monomer and the aromatic group-containing (meth)acrylic acid ester, still further even more preferably at least one monomer selected from the group consisting of styrene and benzyl (meth)acrylate, and still further even more preferably benzyl (meth)acrylate.

[(b-3) Monomer Capable of Forming Graft Chain]

The component (b-3) is used as a monomer component of the water-insoluble polymer. By using the component (b-3), it is possible to introduce a graft chain into the water-insoluble polymer.

The component (b-3) is preferably at least one monomer selected from the group consisting of a macromonomer such as an aromatic group-containing macromonomer and a silicone-based macromonomer, and a polyalkylene glycol macromonomer such as a polyalkylene glycol mono(meth)acrylate, and more preferably at least one monomer selected from the group consisting of an aromatic group-containing macromonomer and a polyalkylene glycol macromonomer, from the viewpoint of improving dispersion stability of the pigment-containing polymer particles in the ink as well as from the viewpoint of improving gloss and water resistance of the resulting ink. Also, from the viewpoint of improving both of gloss and water resistance of the resulting ink, the component (b-3) is preferably a combination of the aromatic group-containing macromonomer and the polyalkylene glycol macromonomer.

The macromonomer is preferably in the form of a compound containing a polymerizable functional group at one terminal end thereof and having a number-average molecular weight of not less than 500 and not more than 100,000 from the viewpoint of improving dispersion stability of the pigment-containing polymer particles in the ink. The polymerizable functional group bonded to one terminal end of the macromonomer is preferably an acryloyloxy group or a methacryloyloxy group, and more preferably a methacryloyloxy group.

The number-average molecular weight of the macromonomer is preferably not less than 1,000 and not more than 10,000.

Meanwhile, the number-average molecular weight of the macromonomer may be measured by gel permeation chromatography using chloroform containing 1 mmol/L of dodecyl dimethylamine as a solvent and using a monodisperse polystyrene having a known molecular weight as a reference standard substance.

The aromatic group-containing macromonomer is for example in the form of a monomer containing a graft chain derived from an aromatic group-containing monomer. When using such a monomer, it is possible to introduce the graft chain derived from the aromatic group-containing monomer into the water-insoluble polymer. It is considered that the monomer containing the graft chain derived from the aromatic group-containing monomer contributes to improvement in dispersibility of the pigment when dispersing the pigment in an organic solvent upon production of the below-mentioned pigment-containing polymer particles as well as improvement in dispersion stability of the pigment-containing polymer particles in the resulting ink to thereby improve gloss and water resistance of the ink.

Examples of an aromatic group-containing monomer constituting the aromatic group-containing macromonomer include the same aromatic group-containing monomers as described with respect to the aforementioned component (b-2). Among these aromatic group-containing monomers, preferred is at least one monomer selected from the group consisting of styrene and benzyl (meth)acrylate, and more preferred is styrene.

Specific examples of commercially available products of the styrene-based macromonomer include "AS-6(S)", "AN-6(S)" and "HS-6(S)" all available from Toagosei Co., Ltd., etc.

Examples of the silicone-based macromonomer include organopolysiloxanes containing a polymerizable functional group at one terminal end thereof, etc.

The aromatic group-containing macromonomer is preferably in the form of a compound containing a polymerizable functional group at one terminal end thereof and having a number-average molecular weight of not less than 500 and not more than 100,000 from the viewpoint of improving dispersion stability of the pigment-containing polymer particles in the ink. The polymerizable functional group bonded to one terminal end of the aromatic group-containing macromonomer is preferably an acryloyloxy group or a methacryloyloxy group, and more preferably a methacryloyloxy group.

The number-average molecular weight of the aromatic group-containing macromonomer is preferably not less than 1,000 and not more than 10,000.

The polyalkylene glycol macromonomer is preferably a polyalkylene glycol (meth)acrylate represented by the following formula (1);

$$CH_2=C(R^1)-CO-(OA)_n-OR^2 \quad (1)$$

wherein $R^1$ is a hydrogen atom or a methyl group; $R^2$ is a hydrogen atom, an alkyl group having not less than 1 and not more than 20 carbon atoms, or a phenyl group; OA is an oxyalkylene group having not less than 2 and not more than 4 carbon atoms; and n represents an average molar number of addition of an alkyleneoxide, and is a number of not less than 1 and not more than 50.

When using the polyalkylene glycol macromonomer, it is possible to introduce a polyalkylene glycol chain into the water-insoluble polymer. It is considered that the water-insoluble polymer containing a polyalkylene glycol chain contributes to improvement in dispersibility of the pigment when dispersing the pigment in an organic solvent upon production of the below-mentioned pigment-containing polymer particles as well as improvement in dispersion stability of the pigment-containing polymer particles in the resulting ink to thereby improve gloss and water resistance of the ink.

In the aforementioned formula (1), the number of carbon atoms in OA as an oxyalkylene group is not less than 2 and not more than 4 and preferably not less than 2 and not more than 3 from the viewpoint of improving dispersion stability of the pigment-containing polymer particles in the ink.

Examples of the oxyalkylene group having not less than 2 and not more than 4 carbon atoms include an oxyethylene group, an oxypropylene group and an oxybutylene group. Among these oxyalkylene groups, from the viewpoint of improving dispersion stability of the pigment-containing polymer particles in the ink, preferred is an oxyethylene group or an oxypropylene group.

In the aforementioned formula (1), from the viewpoint of improving dispersion stability of the pigment-containing polymer particles in the ink, $R^1$ is a hydrogen atom or a methyl group, and preferably a methyl group.

In the aforementioned formula (1), from the viewpoint of improving dispersibility of the pigment when dispersing the pigment in an organic solvent upon production of the below-mentioned pigment-containing polymer particles as well as from the viewpoint of improving dispersion stability of the pigment-containing polymer particles in the ink, $R^2$ is a hydrogen atom, an alkyl group having not less than 1 and not more than 20 carbon atoms or a phenyl group, preferably an alkyl group having not less than 1 and not more than 8 carbon atoms or a phenyl group, and more preferably a phenyl group.

In the aforementioned formula (1), n that represents an average molar number of addition of OA as the oxyalkylene group is a number of not less than 1, preferably not less than 4, more preferably not less than 8 and even more preferably not less than 10, and is also a number of not more than 50, preferably not more than 30, more preferably not more than 20, even more preferably not more than 16 and further even more preferably not more than 14, from the viewpoint of improving dispersion stability of the pigment-containing polymer particles in the ink.

However, the oxyalkylene groups in the number of n may be the same or different from each other. From the viewpoint of improving dispersion stability of the pigment-containing polymer particles in the resulting ink, it is preferred that the oxyalkylene groups in the number of n are constituted of both an oxyethylene group and an oxypropylene group, namely, the polyalkylene glycol chain includes an oxyethylene unit and an oxypropylene unit. When the hydrophilic oxyethylene unit and the hydrophobic oxypropylene unit are included in one molecule of the water-insoluble polymer, it is considered that the water-insoluble polymer containing the polyalkylene glycol chain contributes to improvement in dispersibility of the pigment when dispersing the pigment in an organic solvent upon production of the below-mentioned pigment-containing polymer particles as well as improvement in dispersion stability of the pigment-containing polymer particles in the resulting ink to thereby improve gloss and water resistance of the ink. In addition, when the oxyalkylene groups contained in the polyalkylene glycol chain are different from each other, these oxyalkylene groups may be bonded to each other in any of a block addition form, a random addition form and an alternate addition form.

Examples of the monomer represented by the aforementioned formula (1) include a polyalkylene glycol (meth)acrylate such as a polyethylene glycol (n=1 to 50) mono(meth)acrylate and a polypropylene glycol (n=1 to 50) mono(meth)acrylate; an alkoxy polyalkylene glycol (meth)acrylate such as a methoxy polyethylene glycol (n=1 to 50) mono(meth)acrylate and an ethoxy polyethylene glycol (n=1 to 50) mono(meth)acrylate; a phenoxy (ethylene glycol/propylene glycol copolymer) (n=1 to 50 in which n for ethylene glycol: 1 to 49) (meth)acrylate; and the like. Among these monomers, preferred is at least one monomer selected from the group consisting of an alkoxy polyalkylene glycol (meth)acrylate and a phenoxy (ethylene glycol/propylene glycol copolymer) (n=1 to 50 in which n for ethylene glycol: 1 to 49) (meth)acrylate, and more preferred is a phenoxy (ethylene glycol/propylene glycol copolymer) (n=1 to 50 in which n for ethylene glycol: 1 to 49) (meth)acrylate.

Specific examples of commercially available products of the polyalkylene glycol macromonomer include "NK ESTER M-20G", "NK ESTER M-40G", "NK ESTER M-90G", "NK ESTER M-230G", "NK ESTER M-450G" and "NK ESTER M-900G" (tradenames) all available from Shin-Nakamura Chemical Co., Ltd.; "BLEMMER PE-90", "BLEMMER PE-200", "BLEMMER PE-350", "BLEMMER PME-100", "BLEMMER PME-200" and "BLEMMER PME-400", "BLEMMER PP-500", "BLEMMER PP-800", "BLEMMER PP-1000" and "BLEMMER PP-4000", "BLEMMER AP-150", "BLEMMER AP-400", "BLEMMER AP-550", "BLEMMER 50PEP-300", "BLEMMER 50POEP-800B", "BLEMMER PAE-100" and "BLEMMER 43PAPE-600B" (tradenames) all available from NOF Corporation; and "LIGHT ESTER 041MA" (tradename) available from Kyoeisha Chemical Co., Ltd.

The polyalkylene glycol macromonomer is in the form of a compound containing a polymerizable functional group at one terminal end thereof and having a number-average molecular weight of not less than 500 and not more than 100,000 from the viewpoint of improving dispersion stability of the pigment-containing polymer particles in the ink. As the polymerizable functional group bonded to one terminal end of the polyalkylene glycol macromonomer, preferred is an acryloyloxy group or a methacryloyloxy group, and more preferred is a methacryloyloxy group.

The number-average molecular weight of the polyalkylene glycol macromonomer is preferably not less than 1,000 and not more than 10,000.

The aforementioned components (b-1) to (b-3) may be respectively used alone or in the form of a mixture of any two or more thereof.

Upon production of the water-insoluble polymer, the contents of the aforementioned components (b-1) to (b-3) in the monomer mixture (contents of non-neutralized components; hereinafter defined in the same way), i.e., the contents of the constitutional units derived from the components (b-1) to (b-3), respectively, in the water-insoluble polymer are as follows.

The content of the component (b-1) is preferably not less than 3.0% by mass, more preferably not less than 5.0% by mass and even more preferably not less than 8.0% by mass from the viewpoint of improving dispersion stability of the pigment-containing polymer particles and improving gloss of the resulting ink, and is also preferably not more than 30% by mass, more preferably not more than 25% by mass, even more preferably not more than 20% by mass and further even more preferably not more than 15% by mass from the viewpoint of improving water resistance of the resulting ink.

The content of the component (b-2) is preferably not less than 30% by mass, more preferably not less than 35% by mass, even more preferably not less than 40% by mass and further even more preferably not less than 45% by mass, and is also preferably not more than 80% by mass, more preferably not more than 75% by mass, even more preferably not more than 70% by mass, further even more preferably not more than 65% by mass and still further even more preferably not more than 60% by mass, from the viewpoint of improving adsorptivity of the water-insoluble polymer to the pigment as well as from the viewpoint of improving dispersion stability of the pigment-containing polymer particles.

The content of the component (b-3) is preferably not less than 5.0% by mass, more preferably not less than 7.0% by mass, even more preferably not less than 10% by mass, further even more preferably not less than 15% by mass and still further even more preferably not less than 20% by mass from the viewpoint of improving dispersion stability of the pigment-containing polymer particles, and is also preferably not more than 55% by mass, more preferably not more than 50% by mass and even more preferably not more than 45% by mass from the viewpoint of improving gloss of the resulting ink.

In the case of using the aromatic group-containing macromonomer as the component (b-3), the content of the aromatic group-containing macromonomer is preferably not less than 5% by mass, more preferably not less than 7% by mass and even more preferably not less than 10% by mass, and is also preferably not more than 55% by mass, more preferably not more than 40% by mass, even more preferably not more than 30% by mass, further even more preferably not more than 20% by mass and still further even more preferably not more than 15% by mass, from the viewpoint of improving gloss and water resistance of the resulting ink.

In the case of using the polyalkylene glycol macromonomer as the component (b-3), the content of the polyalkylene glycol macromonomer is preferably not less than 5% by mass, more preferably not less than 10% by mass, even more preferably not less than 15% by mass and further even more preferably not less than 20% by mass, and is also preferably not more than 55% by mass, more preferably not more than 45% by mass, even more preferably not more than 40% by mass, further even more preferably not more than 35% by mass and still further even more preferably not more than 30% by mass, from the viewpoint of improving gloss and water resistance of the resulting ink.

In the case of using a combination of the aromatic group-containing macromonomer and the polyalkylene glycol mono(meth)acrylate as the component (b-3), the mass ratio of the aromatic group-containing macromonomer to the polyalkylene glycol mono(meth)acrylate [aromatic group-containing macromonomer/polyalkylene glycol mono(meth)acrylate] is preferably not less than 10/90, more preferably not less than 15/95 and even more preferably not less than 20/80, and is also preferably not more than 50/50, more preferably not more than 40/60 and even more preferably not more than 30/70, from the viewpoint of improving both of gloss and water resistance of the resulting ink.

(Production of Water-Insoluble Polymer)

The aforementioned water-insoluble polymer may be produced by copolymerizing the aforementioned monomer mixture by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably a polar organic solvent such as aliphatic alcohols having not less than 1 and not more than 3 carbon atoms, ketones, ethers and esters. Specific examples of the solvent include methanol, ethanol, acetone and methyl ethyl ketone. Of these solvents, preferred is methyl ethyl ketone.

The polymerization may be carried out in the presence of a polymerization initiator or a chain transfer agent. As the polymerization initiator, preferred are azo compounds, and more preferred is 2,2'-azobis(2,4-dimethylvaleronitrile). As the chain transfer agent, preferred are mercaptans, and more preferred is 2-mercaptoethanol.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or an atmosphere of an inert gas such as argon.

After completion of the polymerization reaction, the water-insoluble polymer thus produced may be isolated from the reaction solution by conventionally known methods such as reprecipitation and removal of solvent by distillation. In addition, the thus obtained water-insoluble polymer may be subjected to reprecipitation, membrane separation, chromatography, extraction, etc., for removing unreacted monomers, etc., therefrom.

The water-insoluble polymer is preferably used as such in the form of a water-insoluble polymer solution without removing the solvent used in the polymerization reaction therefrom in order to use the organic solvent contained therein as an organic solvent in the below-mentioned step I from the viewpoint of enhancing productivity of the below-mentioned water dispersion of the pigment-containing polymer particles.

The solid content of the water-insoluble polymer solution is preferably not less than 20% by mass and more preferably not less than 30% by mass, and is also preferably not more than 60% by mass and more preferably not more than 50% by mass, from the viewpoint of enhancing productivity of the water dispersion of the pigment-containing polymer particles.

The acid value of the water-insoluble polymer is preferably not less than 30 mgKOH/g, more preferably not less than 40 mgKOH/g, even more preferably not less than 50 mgKOH/g and further even more preferably not less than 60 mgKOH/g, and is also preferably not more than 150 mgKOH/g, more preferably not more than 130 mgKOH/g, even more preferably not more than 120 mgKOH/g, further even more preferably not more than 100 mgKOH/g and still further even more preferably not more than 80 mgKOH/g, from the viewpoint of improving dispersion stability, gloss and water resistance of the resulting ink. The acid value of the water-insoluble polymer may be measured by the method described in Examples below.

The weight-average molecular weight of the water-insoluble polymer is preferably not less than 10,000, more preferably not less than 30,000, even more preferably not less than 50,000, further even more preferably not less than 80,000 and still further even more preferably not less than 100,000 from the viewpoint of improving dispersion stability and water resistance of the resulting ink, and is also preferably not more than 500,000, more preferably not more than 400,000, even more preferably not more than 300,000 and further even more preferably not more than 200,000 from the viewpoint of improving gloss of the resulting ink. The weight-average molecular weight of the water-insoluble polymer may be measured by the method described in Examples below.

[Production of Pigment-Containing Polymer Particles]

The pigment-containing water-insoluble polymer particles (i.e., the pigment-containing polymer particles) can be efficiently produced in the form of a water dispersion thereof by the process including the following steps I and II.

Step I: subjecting a mixture containing the water-insoluble polymer, an organic solvent, the pigment and water (hereinafter also referred to merely as a "pigment mixture") to dispersion treatment to obtain a dispersion treatment product; and Step II: removing the aforementioned organic solvent from the dispersion treatment product obtained in the step I to obtain a water dispersion of the pigment-containing polymer particles (hereinafter also referred to merely as a "pigment water dispersion").

(Step I)

The step I is preferably conducted by the method in which the water-insoluble polymer is first dissolved in the organic solvent, and then the pigment and water, if required, together with a neutralizing agent, a surfactant and the like, are added and mixed in the resulting organic solvent solution of the water-insoluble polymer to obtain a dispersion of an oil-in-water type. The order of addition of the respective components added to the organic solvent solution of the water-insoluble polymer is not particularly limited, and it is preferred that water, the neutralizing agent and the pigment are successively added in this order.

The organic solvent used for dissolving the water-insoluble polymer therein is not particularly limited, and is preferably selected from aliphatic alcohols having not less than 1 and not more than 3 carbon atoms, ketones, ethers, esters and the like. Of these organic solvents, from the viewpoint of improving wettability to the pigment, solubility of the water-insoluble polymer therein and adsorptivity of the water-insoluble polymer to the pigment, more preferred are ketones having not less than 4 and not more than 8 carbon atoms, even more preferred are methyl ethyl ketone and methyl isobutyl ketone, and further even more preferred is methyl ethyl ketone.

When the water-insoluble polymer has been synthesized by the solution polymerization method, the solvent used in the polymerization method may be used as such in the step I.

(Neutralization)

In the case where the water-insoluble polymer is an anionic polymer, an anionic group contained in the water-insoluble polymer may be neutralized using a neutralizing agent. When using the neutralizing agent, the pH value of the dispersion containing the water-insoluble polymer after being neutralized with the neutralizing agent is preferably controlled to not less than 7 and not more than 11.

Examples of the neutralizing agent include hydroxides of alkali metals, ammonia and organic amines. Specific examples of the hydroxides of alkali metals include lithium hydroxide, sodium hydroxide, potassium hydroxide and cesium hydroxide. Among these hydroxides of alkali metals, preferred is sodium hydroxide. Specific examples of the organic amines include trimethylamine, ethylamine, diethylamine, triethylamine and triethanolamine.

As the neutralizing agent, from the viewpoint of improving dispersion stability of the pigment water dispersion and the resulting ink, preferred are the hydroxides of alkali metals and ammonia, and more preferred is a combination of sodium hydroxide and ammonia. In addition, the water-insoluble polymer may be previously neutralized.

The neutralizing agent is preferably used in the form of an aqueous neutralizing agent solution from the viewpoint of accelerating neutralization of the polymer in a sufficient and uniform manner. From the same viewpoint as described above, the concentration of the aqueous neutralizing agent solution is preferably not less than 3% by mass, more preferably not less than 10% by mass and even more preferably not less than 15% by mass, and is also preferably not more than 30% by mass and more preferably not more than 25% by mass.

The degree of neutralization of the anionic group in the water-insoluble polymer is preferably not less than 30 mol %, more preferably not less than 40 mol % and even more preferably not less than 50 mol %, and is also preferably not more than 300 mol % and more preferably not more than 200 mol %, from the viewpoint of improving dispersion stability of the pigment water dispersion and the resulting ink.

The degree of neutralization as described herein means the value obtained by dividing a mole equivalent of the neutralizing agent by a molar amount of the anionic group in the water-insoluble polymer. Inherently, the degree of neutralization of the polymer does not exceed 100 mol %. However, in the present invention, since the degree of neutralization of the polymer is calculated from an amount of the neutralizing agent used, if the neutralizing agent is used in an excessive amount relative to the polymer, the degree of neutralization of the polymer will exceed 100 mol %. The aforementioned anionic group may include a carboxy group of the ionic monomer, etc.

(Contents of Respective Components in Pigment Mixture)

The content of the pigment in the pigment mixture is preferably not less than 5.0% by mass, more preferably not less than 10% by mass and even more preferably not less than 15% by mass, and is also preferably not more than 35% by mass, more preferably not more than 30% by mass and even more preferably not more than 25% by mass, from the viewpoint of improving dispersion stability of the pigment water dispersion and the resulting ink as well as from the viewpoint of improving gloss of the ink.

The content of the water-insoluble polymer in the pigment mixture is preferably not less than 2.0% by mass, more preferably not less than 4.0% by mass and even more preferably not less than 6.0% by mass, and is also preferably not more than 15% by mass, more preferably not more than 12% by mass and even more preferably not more than 10% by mass, from the viewpoint of improving dispersion stability of the pigment water dispersion and the resulting ink as well as from the viewpoint of improving water resistance of the ink.

The content of the organic solvent in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass, from the viewpoint of improving wettability to the pigment and adsorptivity of the water-insoluble polymer to the pigment.

The content of water in the pigment mixture is preferably not less than 40% by mass, more preferably not less than 45% by mass and even more preferably not less than 50% by mass, and is also preferably not more than 80% by mass, more preferably not more than 75% by mass and even more preferably not more than 70% by mass, from the viewpoint of improving dispersion stability of the pigment water dispersion and the resulting ink.

The mass ratio of the pigment to the water-insoluble polymer [pigment/water-insoluble polymer] in the pigment mixture is preferably not less than 30/70, more preferably not less than 40/60, even more preferably not less than 50/50, further even more preferably not less than 60/40 and still further even more preferably not less than 70/30, and is also preferably not more than 90/10, more preferably not more than 85/15 and even more preferably not more than 80/20, from the viewpoint of improving dispersion stability of the pigment water dispersion and the resulting ink as well as from the viewpoint of improving gloss and water resistance of the ink.

In addition, the mass ratio of the pigment to the water-insoluble polymer [pigment/water-insoluble polymer] in the pigment mixture is preferably not less than 30/70, more preferably not less than 35/65 and even more preferably not less than 40/60, and is also preferably not more than 90/10, more preferably not more than 80/20, even more preferably not more than 70/30 and further even more preferably not more than 60/40, from the viewpoint of improving both of gloss and water resistance of the resulting ink.

(Dispersion Treatment of Pigment Mixture)

In the step I, the aforementioned pigment mixture is subjected to dispersion treatment to obtain a dispersion treatment product. The dispersing method of obtaining the aforementioned dispersion treatment product is not particularly limited. The pigment particles may be atomized into fine particles having a desired average particle size only by a substantial dispersion treatment in which shear stress is applied to the pigment mixture. However, it is preferred that the pigment mixture is first subjected to a preliminary dispersion treatment, and then to the substantial dispersion treatment by applying shear stress thereto so as to control the average particle size of the obtained pigment particles to a desired value.

The temperature used in the preliminary dispersion treatment in the step I is preferably not lower than 0° C., and is also preferably not higher than 40° C., more preferably not higher than 30° C. and even more preferably not higher than 25° C. The dispersing time is preferably not less than 0.5 hour and more preferably not less than 0.8 hour, and is also preferably not more than 30 hours, more preferably not more than 10 hours and even more preferably not more than 5 hours.

When subjecting the pigment mixture to the preliminary dispersion treatment, there may be used ordinary mixing and stirring devices such as anchor blades and disper blades. Of these devices, preferred are high-speed stirring mixers.

As the means for applying a shear stress to the pigment mixture in the substantial dispersion treatment, there may be used, for example, kneading machines such as roll mills and kneaders, high-pressure homogenizers such as "Microfluidizer" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the high-pressure homogenizers are preferably used from the viewpoint of reducing the particle size of the pigment.

When conducting the substantial dispersion treatment using the high-pressure homogenizers, it is possible to adjust the particle size of the pigment to a desired value by controlling the pressure used in the substantial dispersion treatment or frequency of passing the dispersion through the dispersing devices.

The pressure used in the substantial dispersion treatment is preferably not less than 60 MPa, more preferably not less than 100 MPa and even more preferably not less than 130 MPa, and is also preferably not more than 200 MPa and more preferably not more than 180 MPa, from the viewpoint of enhancing productivity and cost efficiency.

The frequency of passing the dispersion through the dispersing devices is preferably not less than 3 and more preferably not less than 10, and is also preferably not more than 30 and more preferably not more than 25.

(Step II)

In the step II, the organic solvent is removed from the dispersion treatment product obtained in the step I by any conventionally known methods to obtain a water dispersion of the pigment-containing polymer particles (pigment water dispersion). The organic solvent is preferably substantially completely removed from the thus obtained pigment water dispersion. However, the residual organic solvent may be present in the pigment water dispersion unless the objects and advantageous effects of the present invention are adversely affected by the residual organic solvent. The content of the residual organic solvent in the pigment water dispersion is preferably not more than 0.1% by mass and more preferably not more than 0.01% by mass. In addition, if required, the dispersion treatment product may be subjected to heating and stirring treatments before removing the organic solvent therefrom by distillation.

In the thus obtained pigment water dispersion, the pigment-containing polymer particles as solid components are dispersed in an aqueous medium containing water as a main medium. The configuration of the pigment-containing polymer particles is not particularly limited, and the pigment-containing polymer particles may have any configuration as long as the particles are formed by coating at least the surface of the respective pigment particles with the water-insoluble polymer. Examples of the configuration of the pigment-containing polymer particles include the particle configuration in which the pigment is enclosed or encapsulated in the water-insoluble polymer, the particle configuration in which the pigment is uniformly dispersed in the water-insoluble polymer, and the particle configuration in which the pigment is exposed onto a surface of the respective water-insoluble polymer particles, as well as a mixture of these configurations.

The concentration of the non-volatile components (solid content) in the resulting pigment water dispersion is preferably not less than 10% by mass and more preferably not less than 15% by mass, and is also preferably not more than 30% by mass and more preferably not more than 25% by mass, from the viewpoint of improving dispersion stability of the pigment water dispersion as well as from the viewpoint of facilitating production of the water-based ink. Meanwhile, the solid content of the pigment water dispersion may be measured by the method described in Examples below.

(Composition of Pigment Water Dispersion)

The content of the pigment in the pigment water dispersion is preferably not less than 5.0% by mass, more preferably not less than 7.0% by mass and even more preferably not less than 10% by mass from the viewpoint of improving dispersion stability of the pigment water dispersion and the resulting ink as well as from the viewpoint of improving gloss of the ink, and is also preferably not more than 25% by mass, more preferably not more than 20% by mass and even more preferably not more than 18% by mass from the same viewpoints as described above.

The content of the water-insoluble polymer in the pigment water dispersion is preferably not less than 1.0% by mass, more preferably not less than 3.0% by mass and even more preferably not less than 4.0% by mass from the viewpoint of improving dispersion stability of the pigment water dispersion and the resulting ink as well as from the viewpoint of improving water resistance of the ink, and is also preferably not more than 20% by mass, more preferably not more than 15% by mass, even more preferably not more than 10% by mass and further even more preferably not more than 7.0% by mass from the same viewpoints as described above.

The content of water in the pigment water dispersion is preferably not less than 50% by mass, more preferably not less than 60% by mass and even more preferably not less than 70% by mass from the viewpoint of improving dispersion stability of the pigment water dispersion and the resulting ink, and is also preferably not more than 90% by mass and more preferably not more than 85% by mass from the same viewpoint as described above.

The mass ratio of the pigment to the water-insoluble polymer [pigment/water-insoluble polymer] in the pigment water dispersion is preferably not less than 30/70, more preferably not less than 40/60, even more preferably not less than 50/50, further even more preferably not less than 60/40 and still further even more preferably not less than 70/30, and is also preferably not more than 90/10, more preferably not more than 85/15 and even more preferably not more than 80/20, from the viewpoint of improving dispersion stability of the pigment water dispersion and the resulting ink as well as from the viewpoint of improving gloss and water resistance of the ink.

In addition, the mass ratio of the pigment to the water-insoluble polymer [pigment/water-insoluble polymer] in the pigment water dispersion is preferably not less than 30/70, more preferably not less than 35/65 and even more preferably not less than 40/60, and is also preferably not more than 90/10, more preferably not more than 80/20, even more preferably not more than 70/30 and further even more preferably not more than 60/40, from the viewpoint of improving both of gloss and water resistance of the resulting ink.

The resulting pigment water dispersion may be compounded with various additives usually used in a water-based ink, e.g., such as a solvent, a surfactant, a wetting agent, a penetrant, a dispersant, a viscosity controller, a defoaming agent, a mildew-proof agent, a rust preventive, an antiseptic agent, an ultraviolet absorber and the like, and the resulting dispersion may be directly used as a water-based ink for ink-jet printing.

(Production of Water-Based Ink)

The water-based ink used in the present invention may be produced by compounding the aforementioned pigment water dispersion, if required, with water, a water-soluble organic solvent, a surfactant and various other additives from the viewpoint of improving dispersion stability, gloss and water resistance of the resulting ink.

Examples of the various additives include ordinary additives for inks such as a wetting agent, a penetrant, a dispersant, a viscosity controller, a defoaming agent, a mildew-proof agent, a rust preventive, an antiseptic agent, an ultraviolet absorber and the like.

Respective components of the ink according to the present invention as well as composition and properties of the ink are as follows.

[Water-Soluble Organic Solvent]

Examples of the water-soluble organic solvent include polyhydric alcohols, polyhydric alcohol alkyl ethers, nitrogen-containing heterocyclic compounds, etc.

Examples of the polyhydric alcohols include ethylene glycol, diethylene glycol, triethylene glycol, polyethylene glycol, propylene glycol, dipropylene glycol, polypropylene glycol, glycerin, etc.

Examples of the polyhydric alcohol alkyl ethers include diethylene glycol monoalkyl ethers, triethylene glycol monoalkyl ethers, dipropylene glycol monoalkyl ethers, etc.

Examples of the nitrogen-containing heterocyclic compounds include N-methyl-2-pyrrolidone, 2-pyrrolidone, 1,3-dimethyl imidazolidinone, etc.

Among these water-soluble organic solvents, preferred are polyhydric alcohols, more preferred is at least one compound selected from the group consisting of diethylene glycol, propylene glycol and glycerin, even more preferred is at least one compound selected from the group consisting of propylene glycol and glycerin, and further even more preferred is propylene glycol.

These water-soluble organic solvents may be used alone or in combination of any two or more thereof.

[Surfactant]

As the surfactant, from the viewpoint of improving dispersion stability of the resulting ink, preferred is a nonionic surfactant. Examples of the nonionic surfactant include (1) alkyl ethers, alkenyl ethers, alkynyl ethers or aryl ethers of polyoxyalkylenes which are produced by adding ethyleneoxide, propyleneoxide or butyleneoxide to a saturated or unsaturated, linear or branched higher alcohol having not less than 8 and not more than 22 carbon atoms, a polyhydric alcohol or an aromatic alcohol, (2) esters of a higher alcohol containing a saturated or unsaturated, linear or branched hydrocarbon group having not less than 8 and not more than 22 carbon atoms, and a polyvalent fatty acid, (3) polyoxyalkylene aliphatic amines containing a linear or branched alkyl group or alkenyl group having not less than 8 and not more than 20 carbon atoms, and (4) ester compounds of a higher fatty acid having not less than 8 and not more than 22 carbon atoms and a polyhydric alcohol, or compounds produced by adding ethyleneoxide, propyleneoxide or butyleneoxide to the ester compounds.

The nonionic surfactant is preferably an acetylene glycol-based surfactant. Specific examples of the acetylene glycol-based surfactant include at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol, 2,5,8,11-tetramethyl-6-dodecyne-5,8-diol, 3,5-dimethyl-1-hexyne-3-ol and ethyleneoxide adducts of these compounds. Among these acetylene glycol-based surfactants, preferred is at least one compound selected from the group consisting of 2,4,7,9-tetramethyl-5-decyne-4,7-diol, 3,6-dimethyl-4-octyne-3,6-diol, 2,5-dimethyl-3-hexyne-2,5-diol and ethyleneoxide adducts of these compounds, and more preferred is at least one compound selected from the group consisting of 2,4,7,9-tetramethyl-5-decyne-4,7-diol and ethyleneoxide adducts of the compound.

Examples of commercially available products of the nonionic surfactant include "SURFYNOL 104PG50" (a propylene glycol solution of 2,4,7,9-tetramethyl-5-decyne-4,7-diol; active ingredient content: 50%), "SURFYNOL 465" (an ethyleneoxide (hereinafter also referred to merely as "EO") adduct of 2,4,7,9-tetramethyl-5-decyne-4,7-diol; average molar number of addition of EO: 10), "SURFYNOL 485" (an EO adduct of 2,4,7,9-tetramethyl-5-decyne-4,7-diol; average molar number of addition of EO: 30) and "OLEFIN E1010" (an EO adduct of 2,4,7,9-tetramethyl-5-decyne-4,7-diol; average molar number of addition of EO: 10) all available from Air Products & Chemicals, Inc., "ACETYLENOL E81" (average molar number of addition of EO: 8.1), "ACETYLENOL E100" (average molar number of addition of EO: 10) and "ACETYLENOL E200" (average molar number of addition of EO: 20) all available from Kawaken Fine Chemicals Co., Ltd., and "EMULGEN 120" (polyoxyethylene lauryl ether) available from Kao Corporation.

(Composition of Water-Based Ink)

The water-based ink used in the present invention contains the pigment-containing polymer particles and water, if required, together with the water-soluble organic solvent, the surfactant and various other additives.

The content of the pigment in the water-based ink is preferably not less than 1.0% by mass, more preferably not less than 2.0% by mass and even more preferably not less than 3.0% by mass from the viewpoint of improving gloss of the resulting ink, and is also preferably not more than 20% by mass, more preferably not more than 15% by mass, even more preferably not more than 10% by mass and further even more preferably not more than 8.0% by mass from the viewpoint of improving dispersion stability of the ink.

The content of the water-insoluble polymer in the water-based ink is preferably not less than 0.5% by mass, more preferably not less than 1.0% by mass and even more preferably not less than 1.5% by mass from the viewpoint of improving dispersion stability and water resistance of the resulting ink, and is also preferably not more than 5.0% by mass, more preferably not more than 3.0% by mass and even more preferably not more than 2.5% by mass from the same viewpoint as described above.

The mass ratio of the pigment to the water-insoluble polymer [pigment/water-insoluble polymer] in the water-based ink is preferably not less than 30/70, more preferably not less than 40/60, even more preferably not less than 50/50, further even more preferably not less than 60/40 and still further even more preferably not less than 70/30, and is also preferably not more than 90/10, more preferably not more than 85/15 and even more preferably not more than 80/20, from the viewpoint of improving dispersion stability, gloss and water resistance of the resulting ink.

In addition, the mass ratio of the pigment to the water-insoluble polymer [pigment/water-insoluble polymer] in the water-based ink is preferably not less than 30/70, more preferably not less than 35/65 and even more preferably not less than 40/60, and is also preferably not more than 90/10, more preferably not more than 80/20, even more preferably not more than 70/30 and further even more preferably not more than 60/40, from the viewpoint of improving both of gloss and water resistance of the resulting ink.

The content of the water-soluble organic solvent in the water-based ink is preferably not less than 5% by mass, more preferably not less than 15% by mass and even more preferably not less than 25% by mass from the viewpoint of improving dispersion stability of the resulting ink, and is also preferably not more than 45% by mass, more preferably not more than 40% by mass and even more preferably not more than 35% by mass from the same viewpoint as described above.

The content of the surfactant in the water-based ink is preferably not less than 0.1% by mass, more preferably not less than 0.3% by mass and even more preferably not less than 0.5% by mass from the viewpoint of improving dispersion stability of the resulting ink, and is also preferably not more than 5.0% by mass, more preferably not more than 3.0% by mass and even more preferably not more than 1.0% by mass from the same viewpoint as described above.

The content of water in the water-based ink is preferably not less than 40% by mass and more preferably not less than 50% by mass from the viewpoint of improving dispersion stability of the resulting ink, and is also preferably not more than 80% by mass and more preferably not more than 70% by mass from the same viewpoint as described above.

(Properties of Water-Based Ink)

The average particle size of the pigment-containing polymer particles in the water-based ink is preferably not less than 40 nm, more preferably not less than 60 nm and even more preferably not less than 75 nm, and is also preferably not more than 200 nm, more preferably not more than 180 nm, even more preferably not more than 160 nm and further even more preferably not more than 140 nm, from the viewpoint of improving gloss of the resulting ink. The average particle size of the pigment-containing polymer particles in the water-based ink may be measured by the method described in Examples below.

It is preferred that the pigment-containing polymer particles in the water-based ink are free of swelling or contraction of the particles and flocculation between the particles. It is more preferred that the average particle size of the pigment-containing polymer particles in the water-based ink is the same as the average particle size of the particles in the aforementioned pigment water dispersion. In consequence, the preferred range of the average particle size of the pigment-containing polymer particles in the aforementioned pigment water dispersion is also the same as the preferred range of the average particle size of the particles in the water-based ink. The average particle size of the pigment-containing polymer particles in the aforementioned pigment water dispersion may be measured by the same method for measuring the average particle size of the pigment-containing polymer particles in the water-based ink as described in Examples below.

The viscosity of the water-based ink as measured at 20° C. is preferably not less than 1.0 mPa·s, more preferably not less than 1.5 mPa·s and even more preferably not less than 2.0 mPa·s from the viewpoint of improving dispersion stability, gloss and water resistance of the resulting ink, and is also preferably not more than 10 mPa·s, more preferably not more than 7.0 mPa·s and even more preferably not more than 5.0 mPa·s from the same viewpoint as described above. The viscosity at 20° C. of the water-based ink may be measured by the method described in Examples below.

The pH value of the water-based ink as measured at 20° C. is preferably not less than 5.5, more preferably not less than 6.0, even more preferably not less than 6.5 and further even more preferably not less than 7.0 from the viewpoint of improving dispersion stability, gloss and water resistance of the resulting ink, and is also preferably not more than 11.0, more preferably not more than 10.0, even more preferably not more than 9.5 and further even more preferably not more than 9.0 from the viewpoint of improving the resistance of members to the ink and suppressing skin irritation. The pH value at 20° C. of the water-based ink may be measured by the method described in Examples below.

(Ink-Jet Printing Method)

The ink-jet printing method of the present invention is the method including the step of ejecting the aforementioned water-based ink onto a printing medium to print characters or images on the printing medium.

The water absorption of the printing medium as measured in a pure water contact time of 100 milliseconds is not less than 0 g/m$^2$, and is also not more than 10 g/m$^2$, preferably not more than 5.0 g/m$^2$ and more preferably not more than 3.0 g/m$^2$. The water absorption of the printing medium may be measured by the method described in Examples below.

The printing medium used in the present invention may be a low-water absorbing coated paper or film, etc.

Examples of the coated paper include a general-purpose glossy paper "OK Topcoat Plus" (basis weight: 104.7 g/m$^2$; water absorption as measured in a pure water contact time of 100 milliseconds (hereinafter defined in the same way): 4.9 g/m$^2$) available from Oji Paper Co., Ltd., a multi-color foam glossy coated paper (basis weight: 104.7 g/m$^2$; water absorption: 5.2 g/m$^2$) available from Oji Paper Co., Ltd., "UPM Finesse Gloss" (basis weight: 115 g/m$^2$; water absorption: 3.1 g/m$^2$) available from UPM, "UPM Finesse Matt" (basis weight: 115 g/m$^2$; water absorption: 4.4 g/m$^2$) available from UPM, "TerraPress Silk" (basis weight: 80 g/m$^2$; water absorption: 4.1 g/m$^2$) available from Stora Enso, and the like.

Examples of the film include synthetic resin films such as a polyester film, a polyvinyl chloride film, a polypropylene film, a polyethylene film and a nylon film. These films may be subjected to surface treatments such as corona discharge treatment, etc., if required.

Examples of the generally available films include "LUMIRROR T60" (polyethylene terephthalate; water absorption: 2.3 g/m$^2$) available from Toray Industries Inc., "PVC80B P" (polyvinyl chloride; water absorption: 1.4 g/m$^2$) available from Lintec Corporation, and the like.

Among these printing media, preferred is the film, and more preferred is a polyvinyl chloride film.

The ink droplets are preferably ejected by a piezoelectric method. In the piezoelectric method, the ink droplets are ejected from a number of nozzles communicated with respective pressure chambers by vibrating a wall surface of the respective pressure chambers by means of a piezoelectric element. Meanwhile, in the present invention, there may also be used a thermal method for ejecting the ink droplets.

From the viewpoint of reducing viscosity of the ink, the inside temperature of a printing head upon printing is preferably controlled to not lower than 20° C., more preferably not lower than 25° C. and even more preferably not lower than 30° C., and is also preferably controlled to not higher than 45° C., more preferably not higher than 40° C. and even more preferably not higher than 38° C.

The temperature of the surface of the printing medium opposed to a region of the printing head from which the ink is ejected, is preferably controlled to not lower than 20° C., more preferably not lower than 23° C., even more preferably not lower than 28° C., further even more preferably not lower than 30° C. and still further even more preferably not lower than 31° C., and is also preferably controlled to not higher than 45° C., more preferably not higher than 40° C. and even more preferably not higher than 38° C.

The amount of the water-based ink deposited on the printing medium is preferably not less than 0.1 g/m$^2$, and is also preferably not more than 25 g/m$^2$ and more preferably not more than 20 g/m$^2$, in terms of a solid content thereof, from the viewpoint of improving gloss and water resistance of the resulting ink.

In the ink-jet printing method of the present invention, it is preferred that after conducting the printing by ejecting the aforementioned water-based ink in the form of ink droplets onto the printing medium to print characters or images thereon, the step of drying the ink droplets impacted and deposited on the printing medium is conducted. In addition, in the ink-jet printing method of the present invention, it is possible to use two or more kinds of water-based inks unless the advantageous effects of the present invention are adversely affected thereby. In the case of using the two or more kinds of water-based inks, from the viewpoint of efficiently exhibiting the effect of improving gloss and water resistance of the resulting ink, the drying step is preferably conducted not by the method in which the water-based inks are dried one by one, but by the method in which the two or more kinds of water-based inks are dried at the same time.

In the drying step, the surface of the printing medium is preferably maintained at a temperature of not lower than 40° C., more preferably not lower than 50° C. and even more preferably not lower than 55° C. from the viewpoint of improving gloss and water resistance of the resulting ink, and is also preferably maintained at a temperature of not higher than 90° C., more preferably not higher than 80° C. and even more preferably not higher than 70° C. from the viewpoint of suppressing deformation of the printing medium owing to heat applied thereto and saving energy consumed.

The drying time of the printing medium after being printed is preferably not less than 3 minutes and more preferably not less than 5 minutes, and is also preferably not more than 30 minutes and more preferably not more than 15 minutes, from the viewpoint of improving gloss and water resistance of the resulting ink.

With respect to the aforementioned embodiments, the present invention further provides the following aspects relating to the ink-jet printing method.

<1> An ink-jet printing method including the step of ejecting a water-based ink containing pigment-containing water-insoluble polymer particles and water onto a printing medium to print characters or images on the printing medium, in which the pigment is at least one pigment selected from the group consisting of C.I. Pigment Red 177, C.I. Pigment Red 254, C.I. Pigment Green 7, C.I. Pigment Green 36 and C.I. Pigment Blue 15:6;

the water-insoluble polymer constituting the particles contains a constitutional unit derived from (b-1) an ionic monomer, a constitutional unit derived from (b-2) a hydrophobic monomer and a constitutional unit derived from (b-3) a monomer capable of forming a graft chain; and the printing medium has a water absorption of not less than 0 g/m² and not more than 10 g/m² as measured in a pure water contact time of 100 milliseconds.

<2> The ink-jet printing method according to the aforementioned aspect <1>, wherein the graft chain is at least one chain selected from the group consisting of a polyalkylene glycol chain and a polystyrene chain.

<3> The ink-jet printing method according to the aforementioned aspect <1> or <2>, wherein the monomer (b-1) is preferably a carboxylic acid monomer, more preferably (meth)acrylic acid, and even more preferably methacrylic acid.

<4> The ink-jet printing method according to any one of the aforementioned aspects <1> to <3>, wherein the monomer (b-2) is preferably at least one monomer selected from the group consisting of a (meth)acrylic acid ester containing a hydrocarbon group derived from an aliphatic alcohol, and an aromatic group-containing monomer, more preferably an aromatic group-containing monomer, even more preferably a vinyl monomer containing an aromatic group having not less than 6 and not more than 22 carbon atoms which may contain a substituent group having a hetero atom, further even more preferably at least one monomer selected from the group consisting of a styrene-based monomer and an aromatic group-containing (meth)acrylic acid ester, still further even more preferably at least one monomer selected from the group consisting of styrene and benzyl (meth)acrylate, and still further even more preferably benzyl (meth)acrylate.

<5> The ink-jet printing method according to any one of the aforementioned aspects <1> to <4>, wherein the monomer (b-3) is preferably at least one monomer selected from the group consisting of an aromatic group-containing macromonomer, a silicone-based macromonomer and a polyalkylene glycol macromonomer, more preferably at least one monomer selected from the group consisting of an aromatic group-containing macromonomer and a polyalkylene glycol macromonomer, and even more preferably a combination of an aromatic group-containing macromonomer and a polyalkylene glycol macromonomer.

<6> The ink-jet printing method according to any one of the aforementioned aspects <1> to <5>, wherein the monomer (b-3) is an aromatic group-containing macromonomer containing a graft chain derived from an aromatic group-containing monomer, and the aromatic group-containing monomer is preferably at least one monomer selected from the group consisting of styrene and benzyl (meth)acrylate and more preferably styrene.

<7> The ink-jet printing method according to any one of the aforementioned aspects <1> to <6>, wherein the monomer (b-3) is preferably a polyalkylene glycol macromonomer, and more preferably a polyalkylene glycol (meth)acrylate represented by the following formula (1);

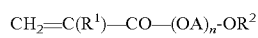   (1)

wherein $R^1$ is a hydrogen atom or a methyl group; $R^2$ is a hydrogen atom, an alkyl group having not less than 1 and not more than 20 carbon atoms, or a phenyl group; OA is an oxyalkylene group having not less than 2 and not more than 4 carbon atoms; and n represents an average molar number of addition of an alkyleneoxide, and is a number of not less than 1 and not more than 50.

<8> The ink-jet printing method according to the aforementioned aspect <7>, wherein in the formula (1), the oxyalkylene group is at least one group selected from the group consisting of an oxyethylene group, an oxypropylene group and an oxybutylene group, and more preferably an oxyethylene group or an oxypropylene group.

<9> The ink-jet printing method according to the aforementioned aspect <7> or <8>, wherein in the formula (1), $R^2$ is preferably an alkyl group having not less than 1 and not more than 8 carbon atoms, or a phenyl group, and more preferably a phenyl group.

<10> The ink-jet printing method according to any one of the aforementioned aspects <7> to <9>, wherein in the formula (1), n that represents an average molar number of addition of the oxyalkylene group is preferably a number of not less than 4, more preferably not less than 8 and even more preferably not less than 10, and is also preferably a number of not more than 30, more preferably not more than 20, even more preferably not more than 16 and further even more preferably not more than 14.

<11> The ink-jet printing method according to any one of the aforementioned aspects <7> to <10>, wherein in the formula (1), the oxyalkylene groups in the number of n are preferably constituted of an oxyethylene group and an oxypropylene group.

<12> The ink-jet printing method according to any one of the aforementioned aspects <7> to <11>, wherein the polyalkylene glycol (meth)acrylate represented by the aforementioned formula (1) is preferably at least one compound selected from the group consisting of an alkoxy polyalkylene glycol (meth)acrylate and a phenoxy (ethylene glycol/propylene glycol copolymer) (n=1 to 50 in which n for ethylene glycol: 1 to 49) (meth)acrylate, and more preferably a phenoxy (ethylene glycol/propylene glycol copolymer) (n=1 to 50 in which n for ethylene glycol: 1 to 49) (meth)acrylate.

<13> The ink-jet printing method according to any one of the aforementioned aspects <1> to <12>, wherein the monomer (b-1) is at least one monomer selected from the group consisting of acrylic acid and methacrylic acid, and the monomer (b-2) is at least one monomer selected from the group consisting of a (meth) acrylic acid ester containing a hydrocarbon group derived from an aliphatic alcohol, and an aromatic group-containing monomer.

<14> The ink-jet printing method according to any one of the aforementioned aspects <1> to <13>, wherein a content of the constitutional unit derived from the monomer (b-1) in the water-insoluble polymer is preferably not less than 3.0% by mass, more preferably not less than 5.0% by mass and even more preferably not less than 8.0% by mass, and is also preferably not more than 30% by mass, more preferably not more than 25% by mass, even more preferably not more than 20% by mass and further even more preferably not more than 15% by mass.

<15> The ink-jet printing method according to any one of the aforementioned aspects <1> to <14>, wherein a content of the constitutional unit derived from the monomer (b-2) in the water-insoluble polymer is not less than 30% by mass, more preferably not less than 35% by mass, even more preferably not less than 40% by mass and further even more preferably not less than 45% by mass, and is also preferably not less than 80% by mass, more preferably not more than 75% by mass, even more preferably not more than 70% by mass, further even more preferably not more than 65% by mass and still further even more preferably not more than 60% by mass.

<16> The ink-jet printing method according to any one of the aforementioned aspects <1> to <15>, wherein a content of the constitutional unit derived from the monomer (b-3) in the water-insoluble polymer is preferably not less than 5.0% by mass, more preferably not less than 7.0% by mass, even more preferably not less than 10% by mass, further even more preferably not less than 15% by mass and still further even more preferably not less than 20% by mass, and is also preferably not more than 55% by mass, more preferably not more than 50% by mass and even more preferably not more than 45% by mass.

<17> The ink-jet printing method according to any one of the aforementioned aspects <1> to <16>, wherein the monomer (b-3) is the aromatic group-containing macromonomer, and a content of a constitutional unit derived from the aromatic group-containing macromonomer in the water-insoluble polymer is preferably not less than 5% by mass, more preferably not less than 7% by mass and even more preferably not less than 10% by mass, and is also preferably not more than 55% by mass, more preferably not more than 40% by mass, even more preferably not more than 30% by mass, further even more preferably not more than 20% by mass and still further even more preferably not more than 15% by mass.

<18> The ink-jet printing method according to any one of the aforementioned aspects <1> to <17>, wherein the monomer (b-3) is the polyalkylene glycol macromonomer, and a content of a constitutional unit derived from the polyalkylene glycol macromonomer in the water-insoluble polymer is preferably not less than 5% by mass, more preferably not less than 10% by mass, even more preferably not less than 15% by mass and further even more preferably not less than 20% by mass, and is also preferably not more than 55% by mass, more preferably not more than 45% by mass, even more preferably not more than 40% by mass, further even more preferably not more than 35% by mass and still further even more preferably not more than 30% by mass.

<19> The ink-jet printing method according to any one of the aforementioned aspects <1> to <18>, wherein a content of the constitutional unit derived from the monomer (b-1) in the water-insoluble polymer is not less than 3.0% by mass and not more than 30% by mass; a content of the constitutional unit derived from the monomer (b-2) in the water-insoluble polymer is not less than 30% by mass and not more than 80% by mass; and a content of the constitutional unit derived from the monomer (b-3) in the water-insoluble polymer is not less than 5.0% by mass and not more than 55% by mass.

<20> The ink-jet printing method according to any one of the aforementioned aspects <1> to <19>, wherein an acid value of the water-insoluble polymer is preferably not less than 30 mgKOH/g, more preferably not less than 40 mgKOH/g, even more preferably not less than 50 mgKOH/g and further even more preferably not less than 60 mgKOH/g, and is also preferably not more than 150 mgKOH/g, more preferably not more than 130 mgKOH/g, even more preferably not more than 120 mgKOH/g, further even more preferably not more than 100 mgKOH/g and still further even more preferably not more than 80 mgKOH/g.

<21> The ink-jet printing method according to any one of the aforementioned aspects <1> to <20>, wherein a weight-average molecular weight of the water-insoluble polymer is preferably not less than 10,000, more preferably not less than 30,000, even more preferably not less than 50,000, further even more preferably not less than 80,000 and still further even more preferably not less than 100,000, and is also preferably not more than 500,000, more preferably not more than 400,000, even more preferably not more than 300,000 and further even more preferably not more than 200,000.

<22> The ink-jet printing method according to any one of the aforementioned aspects <1> to <21>, wherein a content of the pigment in the water-based ink is preferably not less than 1.0% by mass, more preferably not less than 2.0% by mass and even more preferably not less than 3.0% by mass, and is also preferably not more than 20% by mass, more preferably not more than 15% by mass, even more preferably not more than 10% by mass and even more preferably not more than 8.0% by mass.

<23> The ink-jet printing method according to any one of the aforementioned aspects <1> to <22>, wherein a content of the water-insoluble polymer in the water-based ink is preferably not less than 0.5% by mass, more preferably not less than 1.0% by mass and even more preferably not less than 1.5% by mass, and is also preferably not more than 5.0% by mass, more preferably not more than 3.0% by mass and even more preferably not more than 2.5% by mass.

<24> The ink-jet printing method according to any one of the aforementioned aspects <1> to <23>, wherein a content of water in the water-based ink is preferably not less than 40% by mass and more preferably not less than 50% by mass, and is also preferably not more than 80% by mass and more preferably not more than 70% by mass.

<25> The ink-jet printing method according to any one of the aforementioned aspects <1> to <24>, wherein a mass ratio of the pigment to the water-insoluble polymer [pigment/water-insoluble polymer] in the water-based ink is preferably not less than 30/70, more preferably not less than 40/60, even more preferably not less than 50/50, further even more preferably not less than 60/40 and still further even more preferably not less than 70/30, and is also preferably not more than 90/10, more preferably not more than 85/15 and even more preferably not more than 80/20.

<26> The ink-jet printing method according to any one of the aforementioned aspects <1> to <25>, wherein a mass ratio of the pigment to the water-insoluble polymer [pigment/water-insoluble polymer] in the water-based ink is preferably not less than 30/70, more preferably not less than 35/65 and even more preferably not less than 40/60, and is also preferably not more than 90/10, more preferably not more than 80/20, even more preferably not more than 70/30 and further even more preferably not more than 60/40.

<27> The ink-jet printing method according to any one of the aforementioned aspects <1> to <26>, wherein the water-based ink further contains a water-soluble organic solvent, and a content of the water-soluble organic solvent in the water-based ink is preferably not less than 5% by mass, more preferably not less than 15% by mass and even more preferably not less than 25% by mass, and is also preferably not more than 45% by mass, more preferably not more than 40% by mass and even more preferably not more than 35% by mass.

<28> The ink-jet printing method according to any one of the aforementioned aspects <1> to <27>, wherein an average particle size of the pigment-containing polymer particles in the water-based ink is preferably not less than 40 nm, more preferably not less than 60 nm and even more preferably not less than 75 nm, and is also preferably not more than 200 nm, more preferably not more than 180 nm, even more preferably not more than 160 nm and further even more preferably not more than 140 nm.

<29> The ink-jet printing method according to any one of the aforementioned aspects <1> to <28>, wherein the printing medium is preferably a film and more preferably a polyvinyl chloride film.

<30> The ink-jet printing method according to any one of the aforementioned aspects <1> to <29>, further including the step of drying droplets of the ink impacted on the printing medium.

<31> A use of the ink-jet printing method according to any one of the aforementioned aspects <1> to <30> in a piezoelectric type ink-jet printing method.

EXAMPLES

The present invention will be explained in more detail by referring to the following Examples, etc. In the following Example, etc., the "part(s)" and "%" indicate "part(s) by mass" and "% by mass", respectively, unless otherwise specified.

(1) Measurement of Weight-Average Molecular Weight of Water-Insoluble Polymer

The molecular weight of the water-insoluble polymer was measured by gel permeation chromatography [GPA apparatus: "HLA-8120GPA" available from Tosoh Corporation; columns: "TSK-GEL, α-M"×2 available from Tosoh Corporation; flow rate: 1 mL/min)] using a solution prepared by dissolving phosphoric acid and lithium bromide in N,N-dimethyl formamide such that the concentrations of phosphoric acid and lithium bromide in the solution were 60 mmol/L and 50 mmol/L, respectively, as an eluent. Meanwhile, in the aforementioned measurement, a monodisperse polystyrene having a known molecular weight was used as a reference standard substance.

(2) Measurement of Acid Value of Water-Insoluble Polymer

In an automatic potentiometric titrator (power burette; "Model No.: APB-610") available from Kyoto Electronics Manufacturing Co., Ltd., a resin (water-insoluble polymer) was dissolved in a titrant solution prepared by mixing toluene and acetone at a volume ratio of 2:1, and the resulting solution was subjected to titration with a 0.1N potassium hydroxide/ethanol solution by a potentiometric titration method until reaching an end point of the titration observed as an inflection point of the titration curve. The acid value of the water-insoluble polymer was calculated from an amount (titer) of the potassium hydroxide solution used in the titration until reaching the end point.

(3) Measurement of Solid Content

Sodium sulfate dried to constant weight in a desiccator was weighed in an amount of 10.0 g and charged into a 30 mL polypropylene container (φ: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids therein. The solid content of the sample was calculated by dividing the mass of the solids by the mass of the sample initially added.

(4) Measurement of Average Particle Size of Pigment-Containing Polymer Particles in Water-Based Ink The particle sizes of the pigment-containing polymer particles were measured using a laser particle analyzing system "Model No.: ELS-8000" (cumulant analysis) available from Otsuka Electrics Co., Ltd., to determine a cumulant average particle size thereof, and the thus measured cumulant average particle size was regarded as an average particle size of the pigment-containing polymer particles. The dispersion to be measured was diluted with water so as to control a concentration of the particles in the dispersion to $5\times10^{-3}$% by mass, and the thus diluted dispersion was used in the aforementioned measurement. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The data obtained in this measurement were used as the data for the below-mentioned evaluation of dispersion stability of the water-based ink.

(5) Measurement of Viscosity of Water-Based Ink

The viscosity of the water-based ink was measured at 20° C. using an E-type viscometer "Model No.: TV-25" (equipped with a standard cone rotor (1° 34'×R24); rotating speed: 50 rpm) available from Toki Sangyo Co., Ltd. The data obtained in this measurement were used as the data for the below-mentioned evaluation of dispersion stability of the water-based ink.

(6) Measurement of pH of Water-Based Ink

The pH value of the ink was measured at 20° C. using a bench-top pH meter "F-71" available from Horiba Ltd., equipped with a pH electrode "6337-10D" available from Horiba Ltd.

(7) Water Absorption of Printing Medium

The water absorption of the printing medium as measured in a pure water contact time of 100 milliseconds was determined as follows. That is, using an automatic scanning liquid absorptometer "KM500win" available from Kumagai Riki Kogyo Co., Ltd., the amount of pure water transferred to the printing medium was measured by contacting the printing medium with pure water for 100 milliseconds at 23° C. under a relative humidity of 50%. The thus measured amount of pure water transferred to the printing medium was regarded as the aforementioned water absorption of the printing medium. The measuring conditions are shown below.

"Spiral Method"
  Contact time: 0.010 to 1.0 (sec)
  Pitch (mm): 7
  Length Per Sampling (degree): 86.29
  Start Radius (mm): 20
  End Radius (mm): 60
  Min Contact Time (ms): 10
  Max Contact Time (ms): 1000
  Sampling Pattern (1-50): 50
  Number of Sampling Points (>0): 19
"Square Head"
  Split Span (mm): 1
  Split Width (mm): 5

Production of Water-Insoluble Polymer

Production Examples 1-1 to 1-3

The monomers, solvent and chain transfer agent as shown in each column "Initially Charged Monomer Solution" in Table 1 were charged into a reaction vessel equipped with two dropping funnels 1 and 2 and mixed with each other, and the inside atmosphere of the reaction vessel was replaced with nitrogen gas, thereby obtaining an initially charged monomer solution.

Next, the monomers, solvent, polymerization initiator "V-65" (tradename: 2,2'-azobis(2,4-dimethylvaleronitrile)) available from Wako Pure Chemical Industries, Ltd., and chain transfer agent as shown in each column "Dropping Monomer Solution 1" in Table 1 were mixed with each other to obtain a dropping monomer solution 1. The resulting dropping monomer solution 1 was charged into the dropping funnel 1, and the inside atmosphere of the dropping funnel 1 was replaced with nitrogen gas. In addition, the monomers, solvent, polymerization initiator and chain transfer agent as shown in each column "Dropping Monomer Solution 2" in Table 1 were mixed with each other to obtain a dropping monomer solution 2. The resulting dropping monomer solution 2 was charged into the dropping funnel 2, and the inside atmosphere of the dropping funnel 2 was replaced with nitrogen gas.

In a nitrogen atmosphere, the initially charged monomer solution in the reaction vessel was maintained at 77° C. while stirring, and the dropping monomer solution 1 in the dropping funnel 1 was gradually added dropwise to the reaction vessel over 3 hours. Next, the dropping monomer solution 2 in the dropping funnel 2 was gradually added dropwise to the reaction vessel over 2 hours. After completion of the dropwise addition, the resulting mixed solution in the reaction vessel was stirred at 77° C. for 0.5 hour.

Then 1 part of the aforementioned polymerization initiator "V-65" was dissolved in 50 parts of methyl ethyl ketone (hereinafter also referred to merely as "MEK") available from Wako Pure Chemical Industries, Ltd., to prepare a polymerization initiator solution. The thus prepared polymerization initiator solution was added to the aforementioned mixed solution, and the resulting reaction solution was aged while stirring at 77° C. for 0.5 hour. The aforementioned procedure including the preparation and addition of the polymerization initiator solution and the aging of the reaction solution was repeated five more times. Then, after maintaining the reaction solution in the reaction vessel at 80° C. for 1 hour, MEK was added thereto to adjust the solid content of the reaction solution to 40%, thereby obtaining a water-insoluble polymer solution.

TABLE 1

| | | Production Example 1-1 | | | | Production Example 1-2 | | | |
|---|---|---|---|---|---|---|---|---|---|
| | | Initially charged monomer solution (part(s)) | Dropping monomer solution 1 (part(s)) | Dropping monomer solution 2 (part(s)) | Ratios of monomers charged (%) | Initially charged monomer solution (part(s)) | Dropping monomer solution 1 (part(s)) | Dropping monomer solution 2 (part(s)) | Ratios of monomers charged (%) |
| Component (b-1) | MAA | | 88.0 | 22.0 | 11 | | 112.0 | 28.0 | 14 |
| Component (b-2) | BzMA | 49.0 | 392.0 | 49.0 | 49 | | | | |
| | St | | | | | 66.0 | 528.0 | 66.0 | 66 |
| Component (b-3) | St-M | 20.0 | 180.0 | | 10 | | | | |
| | EOPOMA | 30.0 | 240.0 | 30.0 | 30 | 20.0 | 160.0 | 20.0 | 20 |
| Solvent | MEK | 22.5 | 247.5 | 180.0 | | 22.5 | 247.5 | 180.0 | |
| Chain transfer agent | 2-Mercaptoethanol | 0.3 | 2.1 | 0.6 | | 0.3 | 2.1 | 0.6 | |
| Polymerization initiator | "V-65" | | 8.0 | 2.0 | | | 8.0 | 2.0 | |
| Water-insoluble polymer | | | Water-insoluble polymer 1 | | | | Water-insoluble polymer 2 | | |
| Acid value (AV) (mgKOH/g) | | | 72 | | | | 91 | | |
| Weight-average molecular weight | | | 224,000 | | | | 127,000 | | |

| | | | Production Example 1-3 | | |
|---|---|---|---|---|---|
| | | Initially charged monomer solution (part(s)) | Dropping monomer solution 1 (part(s)) | Dropping monomer solution 2 (part(s)) | Ratios of monomers charged (%) |
| Component (b-1) | MAA | | 144.0 | 36.0 | 18 |
| Component (b-2) | BzMA | 67.0 | 536.0 | 67.0 | 67 |
| | St | | | | |
| Component (b-3) | St-M | 30.0 | 270.0 | | 15 |
| | EOPOMA | | | | |
| Solvent | MEK | 22.5 | 247.5 | 180.0 | |
| Chain transfer agent | 2-Mercaptoethanol | 0.3 | 2.1 | 0.6 | |
| Polymerization initiator | "V-65" | | 8.0 | 2.0 | |
| Water-insoluble polymer | | | Water-insoluble polymer 3 | | |
| Acid value (AV) (mgKOH/g) | | | 117 | | |
| Weight-average molecular weight | | | 65,000 | | |

The details of the respective components shown in Table 1 are as follows.

MAA: Methacrylic acid: Reagent available from Wako Pure Chemical Industries, Ltd.

BzMA: Benzyl methacrylate: Reagent available from Wako Pure Chemical Industries, Ltd.

St: Styrene: Reagent available from Wako Pure Chemical Industries, Ltd.

St-M: Styrene macromer: "AS-6S" (tradename; number-average molecular weight: 6,000; end group: methacryloyl group; segment: styrene; toluene solution; solid content: 50%): Available from Toagosei Co., Ltd.

EOPOMA: Phenoxy polyethylene glycol/polypropylene glycol monomethacrylate "BLEMMER 43PAPE-600B" (tradename; average molar number of addition of ethyleneoxide: 6; average molar number of addition of propylene-oxide: 6; block addition): Available from NOF Corporation MEK: Methyl ethyl ketone 2-Mercaptoethanol: Available from Kishida Chemical Co., Ltd.

V-65: 2,2'-Azobis(2,4-dimethylvaleronitrile) "V-65" (tradename): Available from Wako Pure Chemical Industries, Ltd.

Meanwhile, the values as shown in Table 1 with respect to the components other than the styrene macromer are those values measured in the case where these components had an active ingredient content of 100%.

Production of Pigment Water Dispersion

Production Example 2-1

(Step I)

One hundred parts of the solution of the water-insoluble polymer 1 (solid content: 40%) obtained in Production Example 1-1 and 33.5 parts of MEK were mixed with each other to adjust a solid content of the solution of the water-insoluble polymer 1 to 30%.

The resulting MEK solution of the water-insoluble polymer was charged into a 2 L-capacity disper, and while stirring the solution with a stirring blade with a blade diameter of 40 mmϕ at 1400 rpm, 303.1 parts of ion-exchanged water, 7.9 parts of a 5N sodium hydroxide aqueous solution and 3.5 parts of a 25% ammonia aqueous solution were added thereto such that the degree of neutralization of the water-insoluble polymer by sodium hydroxide was adjusted to 65% and the degree of neutralization of the water-insoluble polymer by ammonia was adjusted to 100%. The resulting reaction solution was stirred at 1400 rpm for 15 minutes while cooling the solution in a water bath at 0° C.

Then, 120 parts of C.I. Pigment Red 177 "Fastgen Super Red ATY-01" (tradename; anthraquinone pigment) as a pigment available from DIC Corporation were added to the aforementioned reaction solution, and the resulting mixture was stirred at 6,400 rpm for 1 hour, thereby obtaining a pigment mixture.

The obtained pigment mixture was subjected to dispersion treatment under a pressure of 150 MPa by passing through a Microfluidizer "M-110EH-30XP" available from Microfluidics Corporation 15 times, thereby obtaining a dispersion treatment product. The resulting dispersion treatment product had a solid content of 15.0%.

(Step II)

A 2 L egg-plant shaped flask was charged with 667 parts of the dispersion treatment product obtained in the aforementioned step I, and the dispersion treatment product filled in the flask was maintained under a pressure of 0.09 MPa in a warm water bath adjusted at 60° C. for 1 hour using a reduced-pressure distillation apparatus "Rotary Evaporator N-1000S" available from Tokyo Rikakikai Co., Ltd., operated at a rotating speed of 50 rpm to remove the organic solvent therefrom. Further, the pressure was reduced to 0.07 MPa, and the reaction solution was concentrated under this condition until reaching a solid content of 25%.

The thus obtained concentrated solution was charged into a 500 mL angle rotor, and subjected to centrifugal separation using a high-speed cooling centrifuge "himac CR22G" (temperature set: 20° C.) available from Hitachi Koki Co., Ltd., at 6,000 rpm for 20 minutes. Thereafter, the resulting liquid layer portion was filtered through a 5 μm-mesh membrane filter "Minisart" available from Sartorius Inc.

Added to 400 parts of the resulting filtrate (pigment: 72 parts; water-insoluble polymer 1: 24 parts) were 55.4 parts of ion-exchanged water and further 0.6 part of "Ploxel LV(S)", followed by stirring the resulting mixture at 70° C. for 1 hour. The obtained mixture was cooled to 25° C. and then filtered through the aforementioned 5 μm-mesh filter, and further ion-exchanged water was added to the resulting solution to control a solid content thereof to 20.0%, thereby obtaining a pigment water dispersion 1.

Production Examples 2-2 to 2-15 and 2-17 to 2-23

The same procedure as in Production Example 2-1 was repeated except that the pigment or the water-insoluble polymer was replaced with the respective materials shown in Table 2, thereby obtaining pigment water dispersions 2 to 15 and 17 to 23.

Production Example 2-16

The same procedure as in Production Example 2-1 was repeated except that 100 parts of the solution of the water-insoluble polymer 1 used in the step I was replaced with 200 parts of the solution of the water-insoluble polymer 1, and 120 parts of PR177 as the pigment used in the step I were replaced with 80 parts of C.I. Pigment Blue (PB) 15:6 "CHROMOFINE Blue No. 80" (tradename; ε-type copper phthalocyanine pigment) available from Dainichiseika Color & Chemicals Mfg. Co., Ltd., thereby obtaining a pigment water dispersion 16. The mass ratio of the pigment to the water-insoluble polymer [pigment/water-insoluble polymer] in the resulting pigment water dispersion 16 was 50/50.

TABLE 2

|  |  | Pigment water dispersion | Water-insoluble polymer | Mass ratio [pigment/ water-insoluble | Pigments | | | | |
|---|---|---|---|---|---|---|---|---|---|
|  |  | Kind | Kind | polymer] | Red | Green | Blue | Yellow | Magenta |
| Production | 2-1 | 1 | 1 | 75/25 | PR177 | | | | |
| Examples | 2-2 | 2 | 2 | 75/25 | PR177 | | | | |
|  | 2-3 | 3 | 3 | 75/25 | PR177 | | | | |
|  | 2-4 | 4 | 1 | 75/25 | PR254 | | | | |
|  | 2-5 | 5 | 2 | 75/25 | PR254 | | | | |
|  | 2-6 | 6 | 3 | 75/25 | PR254 | | | | |
|  | 2-7 | 7 | 1 | 75/25 | | | PG7 | | |
|  | 2-8 | 8 | 2 | 75/25 | | | PG7 | | |
|  | 2-9 | 9 | 3 | 75/25 | | | PG7 | | |
|  | 2-10 | 10 | 1 | 75/25 | | | PG36 | | |
|  | 2-11 | 11 | 2 | 75/25 | | | PG36 | | |

TABLE 2-continued

| | Pigment water dispersion Kind | Water-insoluble polymer Kind | Mass ratio [pigment/ water-insoluble polymer] | Pigments | | | | |
|---|---|---|---|---|---|---|---|---|
| | | | | Red | Green | Blue | Yellow | Magenta |
| 2-12 | 12 | 3 | 75/25 | | PG36 | | | |
| 2-13 | 13 | 1 | 75/25 | | | PB15:6 | | |
| 2-14 | 14 | 2 | 75/25 | | | PB15:6 | | |
| 2-15 | 15 | 3 | 75/25 | | | PB15:6 | | |
| 2-16 | 16 | 1 | 50/50 | | | PB15:6 | | |
| 2-17 | 17 | C1(*1) | | PR177 | | | | |
| 2-18 | 18 | C1(*1) | | PR254 | | | | |
| 2-19 | 19 | C1(*1) | | | PG7 | | | |
| 2-20 | 20 | C1(*1) | | | PG36 | | | |
| 2-21 | 21 | C1(*1) | | | | PB15:6 | | |
| 2-22 | 22 | 1 | 75/25 | | | | PY74 | |
| 2-23 | 23 | 1 | 75/25 | | | | | PR122 |

Note
(*1)C1 was a water-soluble polymer, but is shown in the column of "Water-insoluble polymer" for convenience.

Meanwhile, the polymer C1 shown in Table 2 and the below-mentioned Tables 3 and 4 was a water-soluble polymer "JONCRYL 61J" (tradename; styrene/acrylic copolymer; acid value: 195 mgKOH/g; weight-average molecular weight: 12,000) available from Johnson Polymers Ltd. In addition, the pigments used are as follows.
(Red Pigments)
PR177: C.I. Pigment Red 177 "Fastgen Super Red ATY-01" (tradename; anthraquinone pigment) available from DIC Corporation
PR254: C.I. Pigment Red 254 "Heuco Red 325405" (tradename; diketopyrrolopyrrole pigment) available from Heubach Japan K.K.
(Green Pigments)
PG7: C.I. Pigment Green 7 "PV Fast Green GNX" (tradename; chlorinated copper phthalocyanine pigment) available from Clariant Japan K.K.
PG36: C.I. Pigment Green 36 "Monastral Green 6Y-CL" (tradename; brominated copper phthalocyanine pigment) available from Heubach Japan K.K.
(Blue Pigment)
PB15:6: C.I. Pigment Blue 15:6 "CHROMOFINE Blue No. 80" (tradename; ε-type copper phthalocyanine pigment) available from Dainichiseika Color & Chemicals Mfg. Co., Ltd.
(Yellow Pigment)
PY74: C.I. Pigment Yellow 74 "Fast Yellow 7414" (tradename; monoazo pigment) available from Sanyo Color Works, Ltd.
(Magenta Pigment)
PR122: C.I. Pigment Red 122 "Fastogen Super Magenta RTS" (tradename; dimethyl quinacridone pigment) available from DIC Corporation
<Production of Water-Based Ink>

Production Example 3-1 (Ink 1)

The pigment water dispersion 1 was used to prepare an ink 1. That is, the respective components shown in the following ink composition (100 pars in total) were formulated such that the concentration of the pigment in the resulting ink was 5%. Thereafter, the resulting mixture was mixed and stirred for 30 minutes, and the obtained mixed solution was filtered through a 5 μm-mesh filter to obtain the ink 1. The mass ratio of the pigment to the water-insoluble polymer[pigment/water-insoluble polymer] in the thus obtained ink 1 was 75/25, the average particle size of the pigment-containing polymer particles in the ink 1 was 124 nm, and the ink 1 had a viscosity of 3.5 mPa·s and a pH value of 8.7.

| (Ink Composition) | |
|---|---|
| Pigment water dispersion 1 | 33.3 parts |
| Propylene glycol available from Wako Pure Chemical Industries, Ltd. | 30 parts |
| "SURFYNOL 104PG-50" (propylene glycol; active ingredient content: 50%) available from Nissin Chemical Co., Ltd. | 0.5 part |
| "EMULGEN 120" (polyoxyethylene lauryl ether) available from Kao Corporation | 0.5 part |
| Triethanolamine available from Wako Pure Chemical Industries, Ltd. | 0.5 part |
| Ion-exchanged water | 35.2 parts |

Production Examples 3-2 to 3-23 (Inks 2 to 23)

The same procedure as in Production Example 3-1 was repeated except that the pigment water dispersion 1 was replaced with the respective pigment water dispersions 2 to 23, thereby obtaining inks 2 to 23. The average particle size of the pigment-containing polymer particles contained in the respective obtained inks as well as the viscosity and pH value of the respective inks are shown in Tables 3 and 4.
<Method for Evaluation of Dispersion Stability of Water-Based Ink>

The resulting ink was filled in a closed container and subjected to storage test in a thermostatic chamber at 70° C. After the elapse of 7 days from initiation of the storage test, the ink was taken out from the container for measuring the aforementioned average particle size and viscosity to thereby observe the change in particle size and viscosity of the ink from an initial stage of the storage test. The rates of change in average particle size and viscosity of the ink were calculated as absolute values according to the following formulae (omitting the figures below the second decimal place) to evaluate dispersion stability of the ink. The results are shown in Tables 3 and 4. The lower the values of the rates of change in average particle size and viscosity of the ink, the more excellent the dispersion stability of the ink.

Rate (%) of Change in Average Particle Size=|[100−[(average particle size after storage)/(average particle size before storage)]×100]|

Rate (%) of Change in Viscosity=|[100−[(viscosity after storage)/(viscosity before storage)]×100]|

Examples 1 to 16 and Comparative Examples 1 to 5

The respective inks shown in Tables 3 and 4 were loaded into a color printing head of an ink-jet printer of a piezoelectric type "Model No.: EM-930C" available from Seiko Epson Corporation, and the image printing was carried out in the range of from Duty 10% to 100% at the intervals of 10% in a photograph mode (resolution: 1440 dots/inch) on a polyvinyl chloride film for outdoor display "Part Number: PVC80B P11K White" (film thickness: 80 µm; water absorption as measured in pure water contact time of 100 milliseconds: 1.4 g/m$^2$; 60° gloss: 94) available from LINTEC SIGN SYSTEM, INC. The thus printed film was then dried for 10 minutes on a hot plate "Hot Plate Model No.: NA-2" available from As One Corporation whose temperature was set to 60° C., thereby obtaining a printed material with a red, green or blue spot color ink. The temperature of the surface portion of the printing medium opposed to a region of the printing head from which the ink was ejected was adjusted to 23° C.

Reference Example 1

Two kinds of inks, i.e., a yellow ink and a magenta ink, were overprinted on a printing medium, thereby obtaining a printed material with a red color as a second color. Upon the overprinting, an ink set constituted of a combination of the ink 22 as a first ink and the ink 23 as a second ink both obtained in the aforementioned production of the water-based inks was loaded into an ink-jet printer "Model No.: EM-930C" available from Seiko Epson Corporation, and the first ink was ejected onto a polyvinyl chloride film "Part Number: PVC80B P11K White" (film thickness: 80 µm; water absorption as measured in pure water contact time of 100 milliseconds: 1.4 g/m$^2$; 60° gloss: 94) as the printing medium available from LINTEC SIGN SYSTEM, INC., and then the second ink was ejected onto the printing medium and overprinted on the first ink previously ejected. The printing conditions are as follows.

(Printing Conditions)

The first ink and the second ink were respectively printed with Duty 100%. During the printing with the first ink and the second ink, no particular drying operation was conducted, and after completion of the printing with the second ink, the resulting printed material was dried on a hot plate at 60° C. for 10 minutes.

<Method for Evaluation of Gloss>

The gloss (incident angle: 60°) of a Duty 100% printed portion of the printed material was measured using a gloss meter "HANDY GLOSSMETER, Part No.: PG-1M" available from Nippon Denshoku Industries Co., Ltd. The results are shown in Tables 3 and 4. The larger the measured value, the more excellent the gloss.

<Method for Evaluation of Water Resistance>

One droplet of ion-exchanged water was dropped on the Duty 100% printed surface of the printed material, and the printed surface of the printed material was rubbed with a cotton swab "Johnson's Cotton Swabs" (product name) available from Johnson & Johnson K.K., by moving the cotton swab over the printed surface by 10 reciprocative motions to evaluate a water resistance thereof according to the following evaluation ratings. The results are shown in Tables 3 and 4. The ranks 4 and 3 in the following evaluation ratings indicate that the inks can be used in the practical applications without any significant problem.

[Evaluation Ratings]

4: No peeling of the ink from the printed material occurred, and no ink was adhered to the cotton swab.

3: Peeling of the ink occurred over less than 50% of the printed surface area of the printed material, and the ink was adhered to the cotton swab.

2: Peeling of the ink occurred over not less than 50% of the printed surface area of the printed material, and the ink was adhered to the cotton swab.

1: Peeling of the ink occurred so that a background of the printing medium was exposed outside.

TABLE 3

|  |  | Examples | | | Comparative Example | Examples | | | Comparative Example | Reference Example |
| --- | --- | --- | --- | --- | --- | --- | --- | --- | --- | --- |
|  |  | 1 | 2 | 3 | 1 | 4 | 5 | 6 | 2 | 1(*1) |
| Ink | Kind | 1 | 2 | 3 | 17 | 4 | 5 | 6 | 18 | 22  23 |
| Pigment water dispersion | Kind | 1 | 2 | 3 | 17 | 4 | 5 | 6 | 18 | 22  23 |
| Water-insoluble polymer | Kind | 1 | 2 | 3 | C1(*2) | 1 | 2 | 3 | C1(*2) | 1  1 |
| Pigment | Red | PR177 | PR177 | PR177 | PR177 | PR254 | PR254 | PR254 | PR254 | PY74  PR122 |
| Average particle size (nm) | Before storage | 124 | 130 | 136 | 142 | 116 | 121 | 127 | 130 | 128  140 |
|  | After storage | 130 | 137 | 141 | 183 | 122 | 128 | 132 | 205 | 132  145 |
|  | Rate of change (%) | 4.8 | 5.4 | 3.7 | 28.9 | 5.2 | 5.8 | 3.9 | 57.7 | 3.1  3.6 |
| Viscosity (mPa·s) | Before storage | 3.5 | 3.7 | 3.8 | 4.3 | 3.9 | 4.2 | 4.3 | 4.1 | 3.4  3.9 |
|  | After storage | 3.4 | 3.9 | 4.1 | 7.3 | 3.9 | 4.3 | 4.5 | 9.4 | 3.3  3.9 |
|  | Rate of change (%) | 2.9 | 5.4 | 7.8 | 69.8 | 0.0 | 2.4 | 4.7 | 129.3 | 2.9  0.0 |
|  | pH | 8.7 | 8.6 | 8.6 | 8.0 | 8.7 | 8.6 | 8.6 | 8.1 | 8.8  8.9 |
| Evaluation | Gloss | 80 | 83 | 87 | 59 | 81 | 85 | 89 | 45 | 60 |
|  | Water resistance | 4 | 3 | 3 | 1 | 4 | 3 | 3 | 1 | 2 |

Note (*1)In Reference Example 1, the red color was reproduced by a combination of two color inks including the yellow ink 22 containing PY74 and the magenta ink 23 containing PR122.

(*2)C1 was a water-soluble polymer, but is shown in the column of "Water-insoluble polymer" for convenience.

TABLE 4

|  |  | Examples | | | Comparative Example | Examples | | | Comparative Example |
|---|---|---|---|---|---|---|---|---|---|
|  |  | 7 | 8 | 9 | 3 | 10 | 11 | 12 | 4 |
| Ink | Kind | 7 | 8 | 9 | 19 | 10 | 11 | 12 | 20 |
| Pigment water dispersion | Kind | 7 | 8 | 9 | 19 | 10 | 11 | 12 | 20 |
| Water-insoluble polymer | Kind | 1 | 2 | 3 | C1(*1) | 1 | 2 | 3 | C1(*1) |
| Pigment | Green | PG7 | PG7 | PG7 | PG7 | PG36 | PG36 | PG36 | PG36 |
|  | Blue |  |  |  |  |  |  |  |  |
| Average particle size (nm) | Before storage | 112 | 119 | 123 | 133 | 119 | 127 | 133 | 132 |
|  | After storage | 112 | 123 | 125 | 160 | 117 | 132 | 136 | 154 |
|  | Rate of change (%) | 0.0 | 3.4 | 1.6 | 20.3 | 1.7 | 3.9 | 2.3 | 16.7 |
| Viscosity (mPa·s) | Before storage | 3.4 | 3.6 | 3.8 | 3.4 | 3.1 | 3.4 | 3.6 | 3.3 |
|  | After storage | 3.3 | 3.8 | 4.1 | 5.0 | 2.8 | 3.0 | 3.2 | 5.4 |
|  | Rate of change (%) | 2.9 | 5.6 | 7.9 | 47.1 | 9.7 | 11.8 | 11.1 | 63.6 |
|  | pH | 8.7 | 8.6 | 8.6 | 8.0 | 8.5 | 8.5 | 8.5 | 7.9 |
| Evaluation | Gloss | 58 | 64 | 68 | 40 | 54 | 58 | 61 | 37 |
|  | Water resistance | 4 | 3 | 3 | 1 | 4 | 3 | 3 | 1 |

|  |  | Examples | | | | Comparative Example |
|---|---|---|---|---|---|---|
|  |  | 13 | 14 | 15 | 16 | 5 |
| Ink | Kind | 13 | 14 | 15 | 16 | 21 |
| Pigment water dispersion | Kind | 13 | 14 | 15 | 16 | 21 |
| Water-insoluble polymer | Kind | 1 | 2 | 3 | 1 | C1(*1) |
| Pigment | Green |  |  |  |  |  |
|  | Blue | PB15:6 | PB15:6 | PB15:6 | PB15:6 | PB15:6 |
| Average particle size (nm) | Before storage | 125 | 129 | 135 | 132 | 138 |
|  | After storage | 129 | 134 | 138 | 137 | 161 |
|  | Rate of change (%) | 3.2 | 3.9 | 2.2 | 3.8 | 16.7 |
| Viscosity (mPa·s) | Before storage | 3.5 | 3.6 | 3.6 | 4.2 | 3.6 |
|  | After storage | 3.5 | 3.8 | 3.9 | 4.0 | 4.9 |
|  | Rate of change (%) | 0.0 | 5.6 | 8.3 | 4.8 | 36.1 |
|  | pH | 8.8 | 8.6 | 8.6 | 8.9 | 8.1 |
| Evaluation | Gloss | 63 | 65 | 68 | 72 | 42 |
|  | Water resistance | 4 | 3 | 3 | 4 | 1 |

Note
(*1)C1 was a water-soluble polymer, but is shown in the column of "Water-insoluble polymer" for convenience.

As shown in Tables 3 and 4, it was confirmed that the rates of change in average particle size and viscosity of the inks 1 to 16 obtained in Production Examples 3-1 to 3-16 all were lower than those of the inks 17 to 21 obtained in Production Examples 3-17 to 3-21, and therefore were excellent in dispersion stability.

As shown in Tables 3 and 4, it was confirmed that the inks obtained in Examples 1 to 16 were excellent in balance between gloss and water resistance as compared to the inks obtained in Comparative Examples 1 to 5 even though the pigments having hues other than three primary colors were used therein.

On the other hand, in Reference Example 1, although the red color as a second color was reproduced using the PY74 yellow ink and the PR122 magenta ink, the resulting printed material was deteriorated in not only gloss but also water resistance as compared to those obtained in Examples 1 to 6. In addition, in Comparative Examples 1 to 5 in which the inks containing the water-soluble polymer were used, it was not possible to produce printed materials that were excellent in both of gloss and water resistance.

INDUSTRIAL APPLICABILITY

In the ink-jet printing method according to the present invention, when reproducing colors other than three primary colors on a low-water absorbing printing medium, it is possible to obtain printed materials that are excellent in gloss and water resistance. Therefore, the ink-jet printing method according to the present invention can be suitably used as a printing method for obtaining printed materials that are used in severe environmental conditions such as outdoor applications.

The invnetion claimed is:
1. An ink-jet printing method comprising the step of ejecting a water-based ink comprising pigment-containing water-insoluble polymer particles and water onto a printing medium to print characters or images on the printing medium, in which the pigment is C.I. Pigment Red 254;

the water-insoluble polymer constituting the particles comprises a constitutional unit derived from (b-1) an ionic monomer, a constitutional unit derived from (b-2) a hydrophobic monomer, and a constitutional unit derived from (b-3) a monomer capable of forming a graft chain, wherein the (b-1) monomer is a carboxylic acid monomer, wherein the (b-2) monomer is an aromatic group-containing monomer, wherein the monomer (b-3) comprises a polyalkylene glycol macromonomer, wherein the polyalkylene glycol macromonomer is a phenoxy (ethylene glycol/propylene glycol copolymer) (n=1 to 50 in which n for ethylene glycol: 1 to 49) (meth)acrylate, and wherein the content of the constitutional units derived from the polyalkylene glycol macromonomer in the water-insoluble polymer is not less than 20% by mass and not more than 40% by mass, wherein an acid value of the water-insoluble polymer is not less than 30 mgKOH/g and not more than 80 mgKOH/g, wherein the weight-average molecular weight of the water-insoluble polymer is not less than 100,000 and not more than 300,000, wherein the water-insoluble polymer has a solubility in water of not more than 10 grams when the water-insoluble polymer is dried to constant weight at 105° C. for 2 hours and then dissolved in 100 g of water at 25° C.;

a mass ratio of the pigment to the water-insoluble polymer [pigment/water-insoluble polymer] in the water-based ink is not less than 30/70 and not more than 90/10;

the water-based ink further comprises a water-soluble organic solvent, wherein a content of the water-soluble organic solvent in the water-based ink is not less than 25% by mass and not more than 35% by mass, wherein the water-soluble organic solvent is polyhydric alcohol; and the printing medium has a water absorption of not less than 0 g/m² and not more than 10 g/m² as measured in a pure water contact time of 100 milliseconds.

2. The ink-jet printing method according to claim 1, wherein the graft chain may comprise a polystyrene chain.

3. The ink-jet printing method according to claim 1, wherein the monomer (b-3) may comprise an aromatic group-containing macromonomer.

4. The ink-jet printing method according to claim 1, wherein the monomer (b-3) is a combination of the aromatic group-containing macromonomer and the polyalkylene glycol macromonomer.

5. The ink-jet printing method according to claim 1, wherein the monomer (b-1) is at least one monomer selected from the group consisting of acrylic acid and methacrylic acid, and the monomer (b-2) is at least one monomer selected from the group consisting of a styrene-based monomer and an aromatic group-containing (meth)acrylic acid ester.

6. The ink-jet printing method according to claim 1, wherein a content of the constitutional unit derived from the monomer (b-1) in the water-insoluble polymer is not less than 3.0% by mass and not more than 30% by mass; a content of the constitutional unit derived from the monomer (b-2) in the water-insoluble polymer is not less than 30% by mass and not more than 75% by mass; and a content of the constitutional unit derived from the monomer (b-3) in the water-insoluble polymer is not less than 20% by mass and not more than 40% by mass.

7. The ink-jet printing method according to claim 1, wherein a content of water in the water-based ink is not less than 40% by mass and not more than 70% by mass.

8. The ink-jet printing method according to claim 1, wherein a content of the water-insoluble polymer in the water-based ink is not less than 0.5% by mass and not more than 5.0% by mass.

9. The ink-jet printing method according to claim 1, wherein the printing medium is a film.

10. The ink-jet printing method according to claim 1, wherein a content of the pigment in the water-based ink is not less than 1.0% by mass and not more than 20% by mass.

11. The ink-jet printing method according to claim 1, wherein the pigment-containing water-insoluble polymer particles is produced in the form of a water dispersion thereof by the process comprising the following steps I and II, and the water-based ink is produced by compounding the water dispersion, Step I: subjecting a mixture comprising the water-insoluble polymer, an organic solvent, the pigment and water to dispersion treatment to obtain a dispersion treatment product; and Step II: removing the aforementioned organic solvent from the dispersion treatment product obtained in the step I to obtain a water dispersion of the pigment-containing water-insoluble polymer particles.

12. The ink-jet printing method according to claim 1, wherein the water-insoluble polymer is an anionic polymer, an anionic group contained in the water-insoluble polymer is neutralized using a neutralizing agent, and the neutralizing agent is ammonia.

13. The ink-jet printing method according to claim 1, wherein the water-based ink further comprises a surfactant, and a content of the surfactant in the water-based ink is not less than 0.1% by mass and not more than 5.0% by mass.

14. The ink-jet printing method according to claim 13, wherein the surfactant is a nonionic surfactant.

15. The ink-jet printing method according to claim 1, after conducting the printing by ejecting the water-based ink in the form of ink droplets onto the printing medium to print characters or images thereon, further comprising the step of drying the ink droplets impacted and deposited on the printing medium, and in the drying step, the surface of the printing medium is maintained at a temperature of not lower than 40° C. and not higher than 90° C.

16. The ink-jet printing method according to claim 1, wherein an average particle size of the pigment-containing water-insoluble polymer particles in the water-based ink is not less than 75 nm and not more than 140 nm.

17. The ink-jet printing method according to claim 1, wherein the polyhydric alcohol is at least one compound selected from the group consisting of diethylene glycol, propylene glycol and glycerin.

* * * * *